United States Patent
Bush et al.

(10) Patent No.: US 12,206,557 B2
(45) Date of Patent: Jan. 21, 2025

(54) INTELLIGENT MONITORING AND TESTING SYSTEM FOR CABLE NETWORK

(71) Applicant: VIAVI SOLUTIONS INC., San Jose, CA (US)

(72) Inventors: John J. Bush, Bargersville, IN (US); Robert J. Flask, New Palestine, IN (US); Raleigh Benton Stelle, IV, Indianapolis, IN (US); Alvin R. Ruth, Indianapolis, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 644 days.

(21) Appl. No.: 17/493,447

(22) Filed: Oct. 4, 2021

(65) Prior Publication Data
US 2022/0109612 A1 Apr. 7, 2022

Related U.S. Application Data

(60) Provisional application No. 63/086,987, filed on Oct. 2, 2020.

(51) Int. Cl.
| | |
|---|---|
| *H04L 41/16* | (2022.01) |
| *H04L 12/28* | (2006.01) |
| *H04L 41/0631* | (2022.01) |
| *H04L 41/069* | (2022.01) |

(52) U.S. Cl.
CPC .......... *H04L 41/16* (2013.01); *H04L 12/2801* (2013.01); *H04L 41/0631* (2013.01); *H04L 41/069* (2013.01)

(58) Field of Classification Search
CPC ........................................................ H04L 41/16
See application file for complete search history.

(56) References Cited

U.S. PATENT DOCUMENTS

| | | | |
|---|---|---|---|
| 9,960,951 B1* | 5/2018 | Cruickshank, III | ........................ H04L 41/0631 |
| 10,708,119 B1* | 7/2020 | Cruickshank, III | ........................ H04L 41/0631 |
| 10,721,142 B1* | 7/2020 | Mathur | ............... H04L 41/5022 |
| 10,810,525 B1* | 10/2020 | Cruickshank, III | ........................ G06Q 10/063116 |
| 11,197,050 B2* | 12/2021 | Gunasekara | ....... H04N 21/2393 |
| 2014/0282783 A1* | 9/2014 | Totten | .................... H04N 21/61 725/111 |
| 2019/0075128 A1* | 3/2019 | Roosenraad | ........ H04L 63/1425 |
| 2019/0349654 A1* | 11/2019 | Campos | ............... H04J 14/0271 |
| 2020/0162309 A1* | 5/2020 | Serban | ..................... H04B 3/56 |
| 2020/0250559 A1* | 8/2020 | Dinh | ...................... H04L 41/16 |
| 2021/0083926 A1* | 3/2021 | Costa | ............... H04L 41/0686 |
| 2021/0152490 A1* | 5/2021 | Rampley | ............. H04L 41/0895 |
| 2022/0029908 A1* | 1/2022 | Rupe | ....................... H04L 69/40 |
| 2022/0129828 A1* | 4/2022 | Yates | ....................... G06N 5/04 |

* cited by examiner

*Primary Examiner* — Guang W Li
(74) *Attorney, Agent, or Firm* — Mannava & Kang, P.C.

(57) ABSTRACT

An intelligent monitoring and testing system for a cable network determines measurements for a cable plant (CP), including cable modems (CMs) and common network elements. Metrics determined from the measurements are analyzed to detect a service issue and a service sub-issue. Machine learning is applied to the metrics and other related data to determine an optimized workflow for diagnosing, locating, and remediating the service issue and service sub-issue.

20 Claims, 19 Drawing Sheets

Intelligent Test Report — 800

Health
| CEW | 0 | MER | 20dB | UnEQ MER | 20dB |

Impairments
| 4 | Carrier Level | 4 | Micro-Reflection | 8 | In-Band Response |
| 4 | Group Delay | 4 | Ingress | 4 | Impulse Noise |

Network elements affected
- Node Identifier: NID189
- Terminal Device: TD358; TD359; TD340
- Trunk Amplifier: TA658
- Line Amplifier: LA514; LA516
- Test Access Point: TAP489
- Cable Plant subsystem: CP573

PNM Data and Leakage Data
- QoE score: 7.5
- Initial Diagnostic: problem "X" feet from network element TAP489
- Bit Error Ratio: 10 - 8
- Line Amplifier: LA514; metric = 5% SNR
- Test Access Point: TAP489
- Cable Plant subsection: CP573 LTE ingress (leakage) detected

Post Service Data
- QoE score: 9.0
- System Maintenance: repair connector at TAP489; repair cable shielding
- Bit Error Ratio: 10 - 12
- Additional Improvements: improved performance at LA514; LA516

FIG. 8

INTELLIGENT MONITORING AND TESTING SYSTEM FOR CABLE NETWORK

PRIORITY

The present patent application claims priority to U.S. provisional patent application Ser. No. 63/086,987 filed on Oct. 2, 2020, which is incorporated by reference in its entirety.

BACKGROUND

Cable networks have evolved beyond merely broadcasting television signals over a co-ax cable to home subscribers. Subscribers of a cable network have a modem, also known as a cable modem or terminal device, allowing the transmission of digital signals upstream toward the headend of the network. Many services provided by cable modems include: internet service, home shopping service using a television catalogue, and voice-over-IP phone service.

As cable communication systems grow and become more complex, the task of proper system maintenance and troubleshooting becomes more challenging. Upgrading an existing cable network communication standard, such as upgrading from Data Over Cable Service Interface Specification (DOCSIS) 3.0 to DOCSIS 3.1, may place greater demands on cable system infrastructure and increase network sensitivity to network leakage and faults.

Current cable network technology generally looks at systems and problems individually, and generally does not intelligently monitor and diagnose issues in the cable network using multiple data sources. Current network monitoring and testing is not self-learning and does not have the capability to look at patterns and understand a preferred method to guide a technician on the best route and method to attack system problems.

SUMMARY OF THE DISCLOSURE

An intelligent monitoring and testing system for a cable network determines fora cable modem (CM) undertest in the cable network a corresponding metric indicative of a service issue that can be causing communication errors between the CM and a cable modem termination system (CMTS). The metric is compared with a predetermined threshold value and a master service record is created indicating a service issue. A cable plant (CP) section, including CP subsections, related to the CM under test is determined and a leakage database is queried to obtain CP leakage metrics for each of the determined CP subsections. A composite metric is automatically created by combining the CM quality metric with each of the CP leakage metrics. Additional databases, such as a proactive network management database, a weather forecast database, and a workforce management database are queried to provide additional data related to the service issue. The master service record is updated and an optimized service technician work order is produced.

BRIEF DESCRIPTION OF THE DRAWINGS

Features of the present disclosure are illustrated by way of examples shown in the following figures. In the following figures, like numerals indicate like elements, in which:

FIG. 8 is an example intelligent test report associated with Pro-active Network Maintenance data, which is acquired by a test module system, according to an example of the present disclosure;

DETAILED DESCRIPTION

Figure 1:
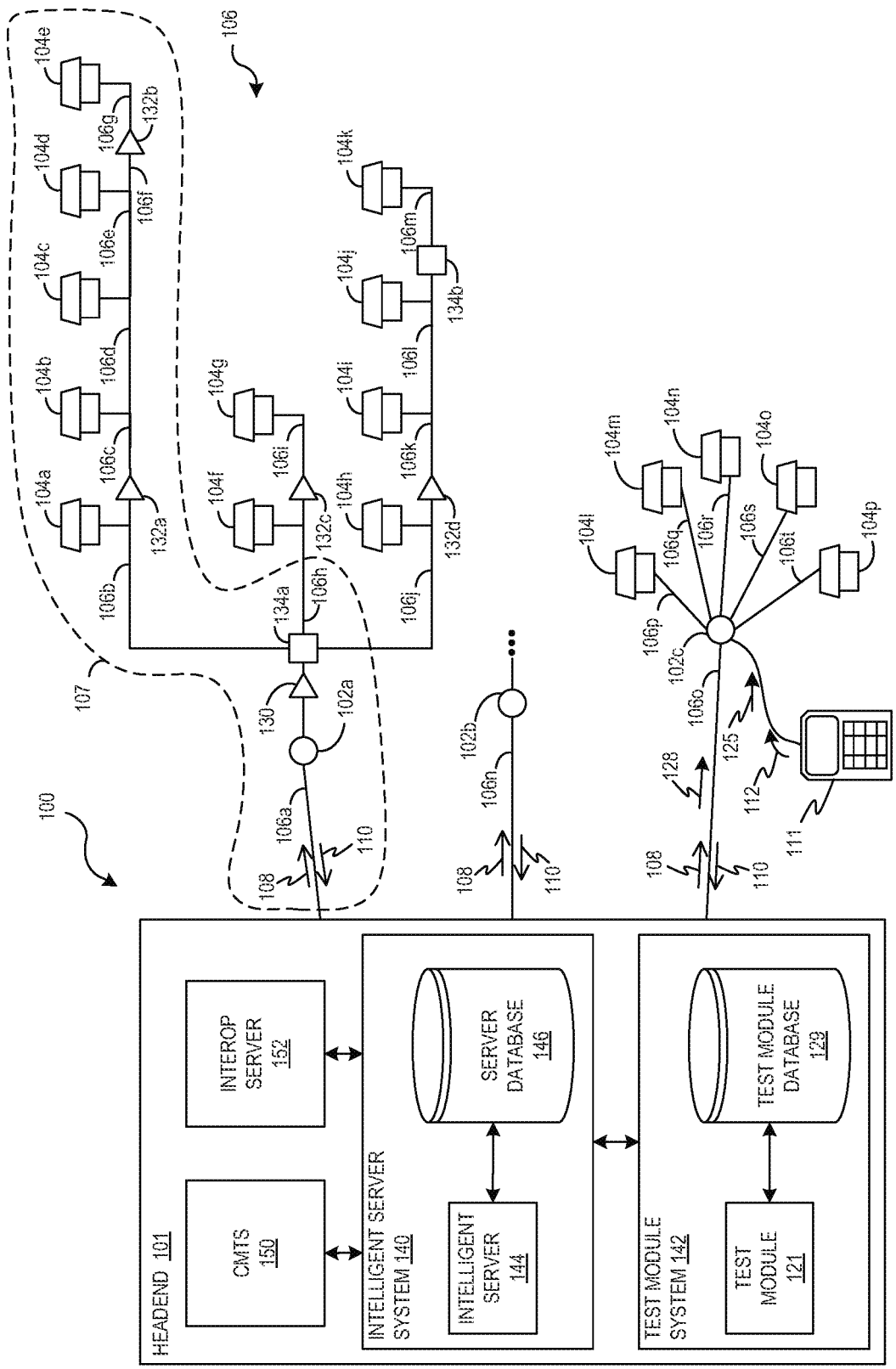
FIG. 1 is a schematic diagram of a cable network, including a headend, a cable plant, terminal devices, an intelligent server system, and a test module system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Through out the present disclosure, the terms "a" and "an" are intended to denote at least one of a particular element. As used herein, the term "includes" means includes but not limited to, the term "including" means including but not limited to. The term "based on" means based at least in part on.

According to an example, a cable network is a broadband cable access network that generally provides bidirectional communication between a cable television headend, often referred to simply as a headend, and a plurality of cable modems (CMs) through a CP. The CP generally refers to the physical optical fiber and/or coaxial radio frequency (RF)

cable and interconnected common network elements, such as optical nodes, trunk RF amplifiers, and line RF amplifiers.

In bidirectional cable networks, downstream and upstream signals occupy separate frequency bands, also known as downstream and upstream spectral bands. One example technology option is based on a downstream channel identification plan known as Cable Television Channel Identification Plan, CEA-542-C, February 2009, by the Consumer Electronics Association (CEA). CEA-542-C may be referred to as the North America CEA Standard, CEA-542, or the CEA standard.

The spectral band is typically divided into channels. CEA-542-C designates North America 6 MHz channel frequency allocations for 158 channels up to 1002 MHz, with a method of specifying higher channels. CEA-542-C does not preclude channel mapping in cable systems. In North America, for example, the downstream spectral band typically spans from 50 MHz to 860 MHz while the upstream spectral band typically spans from 5 MHz to 42 MHz. Downstream channel signals co-propagate in the downstream spectral band, and upstream channel signals co-propagate in the upstream spectral band. The frequency separation of the downstream and upstream spectral bands allows bidirectional amplification of these signals propagating in common cable in opposite directions. A cable network channel may be referred to as a CEA channel.

To provide upstream communication to multiple subscribers, the upstream frequency channels may be used in a time-division multiplexing (TDM) mode, depending upon a version of DOCSIS being used. In DOCSIS 3.1, upstream communication may be provided using Orthogonal Frequency Division Multiple Access (OFDMA), and downstream channels may be provided using Orthogonal Frequency Division Multiplexing (OFDM). OFDMA provides a communication using a group, of a configurable number, K, of consecutive OFDMA symbols. A frame comprises either a group of probing symbols or a column of minislots across the spectrum of the OFDMA channel. Multiple modems can share the same OFDMA frame simultaneously by transmitting data and pilots on allocated subcarriers within the frame. For upstream communication, occupied bandwidth for a single OFDMA channel may be considered to be the sum of the bandwidth in all the subcarriers of that OFDMA channel which are not excluded. The upstream occupied bandwidth is calculated as the number of subcarriers which are not excluded, multiplied by the subcarrier spacing. Occupied bandwidth for a transmit channel set may include a sum of the occupied bandwidth of all OFDMA channels plus the bandwidth of the legacy channels (counted as 1.25 times the modulation rate for each legacy channel) in a cable modem's transmit channel set. The combined bandwidth of all the mini-slots in the channel is normally smaller than the upstream occupied bandwidth due to the existence of unused subcarriers. The bandwidth occupied by an OFDMA probe with a skip value of zero is equal to the upstream occupied bandwidth.

To provide downstream communication to multiple subscribers, OFDM provides data transmission in which a large number of closely-spaced or overlapping very-narrow-bandwidth orthogonal Quadrature Amplitude Modulation (QAM) signals are transmitted within a given channel. Each of the QAM signals, called a subcarrier, carries a small percentage of the total payload at a very low data rate. For downstream communication, downstream occupied bandwidth is the sum of the bandwidth in all standard channel frequency allocations (e.g., 6 MHz spaced CEA channels) that are occupied by the OFDM channel. The CEA channels which are occupied by the OFDM signal are those which contain any of the Modulated Spectrum and/or taper region shaped by the OFDM channels' transmit windowing, where the values for the taper regions are defined in Appendix V as a function of the Roll-Off Period. It is possible, but not problematic, for a CEA channel to be "occupied" by two OFDM channels.

In general, each cable modem is assigned a time slot, within which it is allowed to transmit information. The time slots are assigned dynamically by a CMTS disposed at the headend. The time slot information is communicated by CMTS to individual cable modems via an allocated downstream channel. Subscribers access available network resources by using a data communication bridge established between CMTS and individual cable modems. Subscribers send data from their digital devices into cable modems, which then relay the data to the CMTS through a CP. The CMTS, in turn, relays the information to appropriate services such as, for example, internet servers. Information destined to the subscriber digital device is provided from the internet servers to the CMTS, which in turn relays the information to individual cable modems. The cable modems then relay the information to the digital devices used by the subscribers.

Migration from DOCSIS 3.0 to DOCSIS 3.1 in existing CPs may provide a significant increase in upstream and downstream capacity, and greatly increase an end user's Quality of Service (QoS) and Quality of Experience (QoE). In general, QoS measures key network performance metrics while QoE focuses on an individual user's happiness or frustration with network service. DOCSIS 3.1 supports capacities up to 10 Gbit/s downstream and 1 Gbit/s upstream using 4096 QAM with 25 kHz or 50 kHz wide OFDM subcarriers, DOCSIS 3.1 supports subcarriers that may be bonded inside a block spectrum to increase data capacity to an end user, and includes algorithms to reduce latency in packet-switched networks.

One challenge to detecting and eliminating faults in a cable network results from a random nature of signal bursts from individual cable modems. Although the cable modems are allocated time slots for upstream transmission, the transmission itself depends on network activity of individual subscribers. Furthermore, upstream signal bursts from cable modems have a very short duration and arrive intermittently from a multitude of locations in the cable network. Consequently, an upstream signal from a faulty location may be interspersed with upstream signals from locations that are functioning normally. To detect and eliminate faults in a cable network, it is important to properly identify faulty network locations. Moreover, faults at one location may have an impact on other locations, or a grouping of relatively small faults may have a cumulative effect on QoS and QoE.

Some fault locations may be detected at the headend, while the fault itself typically occurs at a remote location. For example, a network problem is analyzed at the headend, a geographical location of the fault is determined, a technician is physically dispatched to the fault location to fix the problem, and then the problem is checked at the headend to ensure that the problem is fixed. Two technicians equipped with mobile communications devices may communicate with each other, with one technician remaining at the headend, and the second technician moving around in the field. This solution is costly because it increases labor costs. Furthermore, it is often difficult for the technician located at the headend to verbally describe the overserved signal degradation patterns to the technician located in the field. Also, data indicating a fault or the potential for a fault in a CP may be provided from a number of sources.

Physical constraints on CP infrastructure may also render faults or leakage to be intermittent. For example, a slight bend or movement in a cable at one point in time may create an intermittent fault or leak that later becomes undetectable. Weather patterns may intermittently affect CP integrity, which may render difficulties in fault or leakage detection. Moreover, leakage or interference from radio communications may be intermittent and enter the network at one location while having an effect at other locations.

In accordance with examples of the present disclosure, set forth in greater detail below, an intelligent monitoring and testing system for a CP is described. The system utilizes multiple different datasets originating and controlled by different sources to intelligently locate, diagnose and remediate cable network problems. The system may automatically diagnose and provide a workflow to properly walk a manager/technician through the process of locating and fixing issues in the cable network. By combining these datasets, the system itself has enough information to direct a field technician to the proper location, and also provide a detailed workflow to eliminate CP service issues. The system provides automated creation of processes and workflows to minimize guess work, and enhance quality of service. Furthermore, pattern recognition and artificial intelligence may be used to analyze previous CP service issues, including data from the combined datasets for each of the CP service issues, to determine whether a solution to current CP service issue matches a previous CP service issue and to generate a workflow based on matching previous CP service issues. Accordingly, the fixes for previous CP service issues can be leveraged to determine fixes for a current CP service issue, which improves efficiency in fixing CP service issues and improves customer QoE.

According to an example, data for the datasets may originate from multiple separate systems, may be tagged in a predetermined format, and maintained in the separate systems. Alternately, tagged data may be stored in a composite system database. As described in greater detail below, the system may combine the data in a central source as a repository of prior network repair workflows and intelligently extrapolate the ever-increasing stored workflows to determine prospective workflows for new situations. Data sources may include: Pro-active Network Maintenance (PNM) data from a PNM system; leakage data from a leakage system; in-line device data from an in-line device system; meter data from a meter system; upstream monitoring data from an upstream monitoring system; downstream monitoring data from a downstream monitoring system; weather forecast data from a weather forecast system; Emergency Alert System (EAS) data from an emergency management system; workforce management (WFM) system data from a WFM system; QoE data from a QoE system, fiber monitoring data from a fiber monitoring system; and on-site system data from a custom on site system at a service location.

A system of the present disclosure is able to analyze and look at data from multiple systems to n of only see what problem exists, but to properly help guide technicians and managers to the exact workflow which will or could fix multiple service issues affecting terminal devices in one shot. The system removes the guess work by utilizing datasets located in different silos and plugs the datasets into one intelligent server system for analysis and technician work order generation. The system of the present disclosure may include machine learning that has the capability to identify patterns and make predictions to therefore guide the service technician on the best route to attack their system problems. According to an example, machine learning may be provided by executing a procedure for model evaluation. The procedure may include Problem Characterization, Data Collection, Data Preparation, Modeling, and Model Evaluation. Also, the system can generate an optimized work order that includes steps for a technician to remediate any service issues and related sub-issues to the service issues in an efficient manner.

FIG. 1 is a schematic diagram of cable network 100, including headend 101, CP 106, and CMs 104, according to an example of the present disclosure. Test instrument 111 may be coupled to CP 106 at various points for testing. In an example that is shown, test instrument 111 may connect to a node 102 of CP 106 but may be operatively coupled to any network element of cable system 100, including CMs 104 and test access points (TAPS). Cable network 100 includes a plurality of nodes 102, e.g., nodes 102a-102c, disposed between headend 101 and CMs 104, e.g., CMs 104a-104p. CMs 104 are also known as terminal devices and are part of customer premises equipment (CPE). CP 106 connects CMs 104 to headend 101 through a plurality of network elements, which include the nodes 102. ACM 104 is generally resident at a service location, such as a customer premises. ACM 104 can serve as a service connection point for a set top box (STB) and voice over internet protocol (VoIP) phone systems. In operation, headend 101 sends downstream signals 108 to CMs 104 and other network elements through CP 106. The downstream signals 108 may include TV broadcasting signals, as well as DOCSIS downstream data packets, control signals, and testing signals. CMs 104 send upstream signals 110 to headend 101. Upstream signals 110 may include, for example, DOCSIS upstream data bursts.

According to an example, nodes 102 are fiber optical nodes. A fiber optic node 102 has a broadband optical receiver, which converts downstream optically modulated signals originating from headend 101 into electrical signals going to the terminal devices, such as CMs 104. The downstream signal is a RF modulated signal that typically begins at 50 megahertz (MHz) and ranges from 550-1000 MHz on the upper end. The fiber optic node 102 also contains a reverse or return-path transmitter that sends communication from the CMs 104 back to the headend 101. In North America, this reverse signal is a modulated RF signal ranging from 5-42 MHz while in other parts of the world, the range is 5-65 MHz. The optical coupler combined with the optical receiver may form a node 102. The optical portion of the network provides a large amount of flexibility. If there are not many fiber-optic cables to the node, wavelength division multiplexing can be used to combine multiple optical signals onto the same fiber. Optical filters are used to combine and split optical wavelengths onto the single fiber. For example, the downstream signal could be on a wavelength at 1490 nanometers (nm) and the return signal could be on a wavelength at 1310 nm. Nodes 102 may be active or passive, and there may be a plurality of nodes 102 disposed between headend 101 and CMs 104. If the fiber optic portion of CP 106 is passive, this portion may be referred to as a passive optical network (PON). In general, this architecture implements a point-to-multipoint topology, in which a single optical fiber serves multiple endpoints by using unpowered (passive) fiber optic splitters to divide the fiber bandwidth among multiple access points. PONS are often referred to as the "last mile" between an Internet service provider (ISP) and its customers. A plurality of different in-line network elements, e.g., common network elements, may be disposed between nodes 102 and CMs 104, including trunk amplifier 130, TAPs 134, and line amplifiers 132.

According to an example, headend 101 includes an intelligent server system (ISS) 140, a test module system 142, a cable modem termination system (CMTS) 150, and an interoperation (interop) server 152. ISS 140 includes an IS 144 that communicates with server database 146. ISS 140 provides intelligent server system management for a number of separate servers or databases, set forth in greater detail below. Test module system 142 provides testing support for cable network 100, including support for direct technician testing in the field and system-initiated testing of network elements. CMTS 150 provides high speed data services, such as Internet or VoIP, to CMs 104. CMTS 150 provides many of the same functions provided by a digital subscriber line access multiplexer (DSLAM) in a digital subscriber line (DSL) system. According to an example, CMTS 150 includes a number of individual CMTS units, each capable of serving different cable modem population sizes, such as from 4,000 CMs to 150,000 CMs or more, CMTS 150 may have between 1-12 CMTS units to service the cable modem population served by headend 101. According to an example, CMTS 150 may be located at a physical facility as part of headend 101 or may be located at an intermediate location between headend 101 and CP 106, such as at an HFC hub. CMTS 150 connects headend 101 with CP 106. CMTS 150 forwards packets between these two domains, and optionally to forward packets between upstream and downstream channels on the HFC network of CP 106. CMTS 150 performs this forwarding with any combination of link-layer (bridging) and network-layer (routing) semantics.

Interop server 152 provides a software framework including a framework class library (FCL) that provides, among other things, software language interoperability across several programming languages, a common language runtime (CLR), also known as a virtual machine, to manage execution of programs and enable just in time compilation of intermediate language code into machine instructions for execution on a central processing unit (CPU) of a server, and interacts with a plurality of software component objects. Interop server 152 provides access to legacy equipment and infrastructure in an evolving system without modification of the original equipment. An example is the .NET Framework developed by Microsoft that runs primarily on Microsoft Windows systems.

According to an example, interop server 152 may support various applications used in a back-office configuration and other support to devices on a DOCSIS Network of CP 106. These applications may use IPv4 and/or IPv6 as appropriate to the particular operator's deployment. The following applications include provisioning systems and network management systems (NMS). An example provisioning system is a DHCP server, that provides a CM 104 with initial configuration information, including the device IP address (es), when CM 104 boots.

Another provisioning system is a Configuration File server, which is used to download configuration files to CMs 104 when they boot. Configuration files are in binary format and permit the configuration of the CM's parameters. Another provisioning system is a Software Download server, which is used to download software upgrades to the CMs 104, and a Time Protocol server, which provides Time Protocol clients, typically CMs 104, with the current time of day.

According an example, the NMS is a Simple Network Management Protocol (SNMP) Manager that allows the operator at the headend 101 to configure and monitor SNMP Agents which reside within the CMs 104. An SNMP may manage a Data Model (as opposed to an Information Model), which is defined in DOCSIS 3.1 at a lower level of abstraction, intended for implementations, and includes protocol-specific constructs. Since conceptual models can be implemented in different ways, multiple Data Models can be derived from a single Information Model. Data Models are technology specific. The CM 104 has defined Data Models for SN MP as SN MP Management Information Base (MIB) modules.

Cable network 100 may include CP subsections 106a-106t connecting to headend 101 to customer premises. The CP subsections 106a-106t may include all-coax or hybrid-fiber coax (HFC) or fiber to the home. As set forth by way of an example in greater detail below, a service issue related to CM 104d may trigger an analysis of CP section 107, including CP subsections 106a-106g, and interconnected network elements such as node 102a, trunk amplifier 130, TAP 134a line amplifier 132a, and line amplifier 132b. According to an example, cable network 100 uses a tree-and-branch architecture with analog transmission. A CM 104 connects between CP 106 and an end user's home network, bridging packet transmission between them. Many CPE, such as a set top box, can connect to local area network (LAN) interfaces of CM 104. CPE devices can be embedded with the CM in a single device, or they can be separate standalone devices. CPE devices may use IPv4, IPv6 or both forms of IP addressing. Examples of typical CPE devices are home routers, set-top devices, smart TIVs, smartphones, and personal computers.

Test module system 142 includes a test module 121 that communicates with test module database 129. Depending upon the type of traffic and testing, communication with the CP 106 may be received by ISS 140, test module system 142, CMTS 150, or any combination thereof. Likewise, testing data received and analyzed by test module system 142 may be stored in ISS 140, and testing directed by ISS 140 may be performed by test module system 142.

According to an example, monitoring and testing of CP 106 may be performed in cooperation with a test instrument, such as test instrument 111. Test instrument 111 may be used in diagnosis and testing of a variety of in-line network elements, such as nodes 102, trunk amplifier 130, TAP 134, line amplifiers 132, and terminal devices such as CIM 104. Test instrument 111 may provide data that may interact with test module system 142. Data from test instrument 111 may be stored in test module database 129 and/or may be stored in other databases, such as server database 146 in ISS 140.

According to an example, test instrument 111 is operably coupled to one of the nodes 102. The test instrument 111 is configured to send a test request 112 to the headend 101 for demodulating and obtaining signal quality information of upstream data packet 125 generated by a certain device connected to the cable network 100. This device can be one of CMs 104, or test instrument 111 itself. The device selected for testing is preferably identified by its media access control (MAC) address. The MAC address is selectable by an operator of the test instrument 111. In the example of FIG. 1, test instrument 111 sends the Upstream data packet 125, and, accordingly, the MAC address is that of test instrument 111 itself. The test request 112 is received by a test module 121 located at the headend 101, and the test may be performed.

Figure 1A:
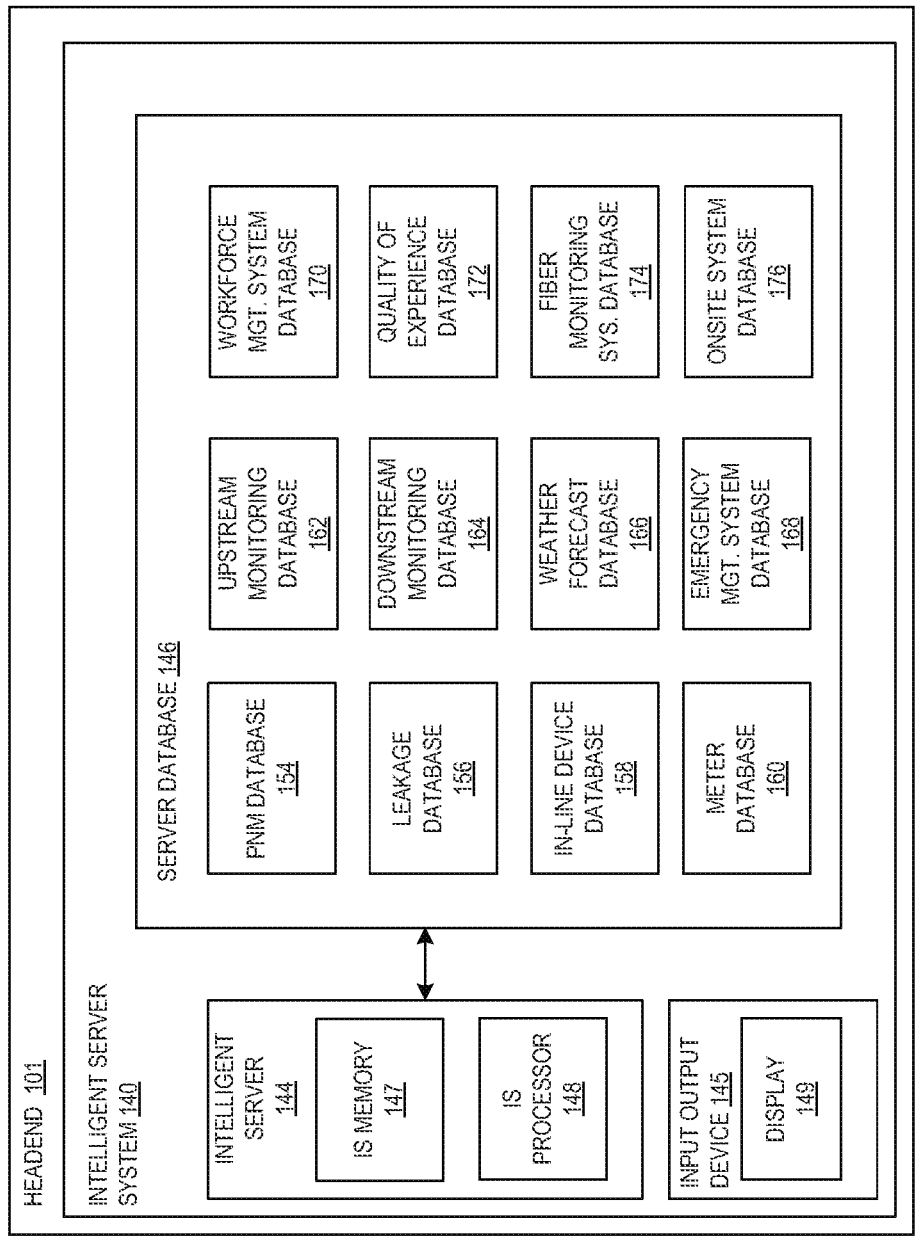
FIG. 1A is detailed block diagram of the intelligent server system including an intelligent server and server database, according to an example of the present disclosure.

FIG. 1A is a detailed block diagram of ISS 140 including the intelligent server (IS) 144 and server database 146, according to an example of the present disclosure. IS 144 includes IS memory 147 to store machine readable instructions and IS processor 148 to execute the machine readable instructions stored in IS memory 147. IS 144 may communicate with an input output device 145, which may include a keyboard, a mouse, and/or display 149. IS processor 148 executes the machine readable instructions to generate a graphical user interface (GUI) on display 149. Server database 146 includes data from a number of separate servers and systems. The server database 146 shown in FIG. 1A includes multiple databases by way of example to illustrate the different types of data that may be stored in server database 146. The server database 146 may comprise a single database or multiple databases. According to an example, data in server database 146 is populated from separate systems.

Figure 1B:
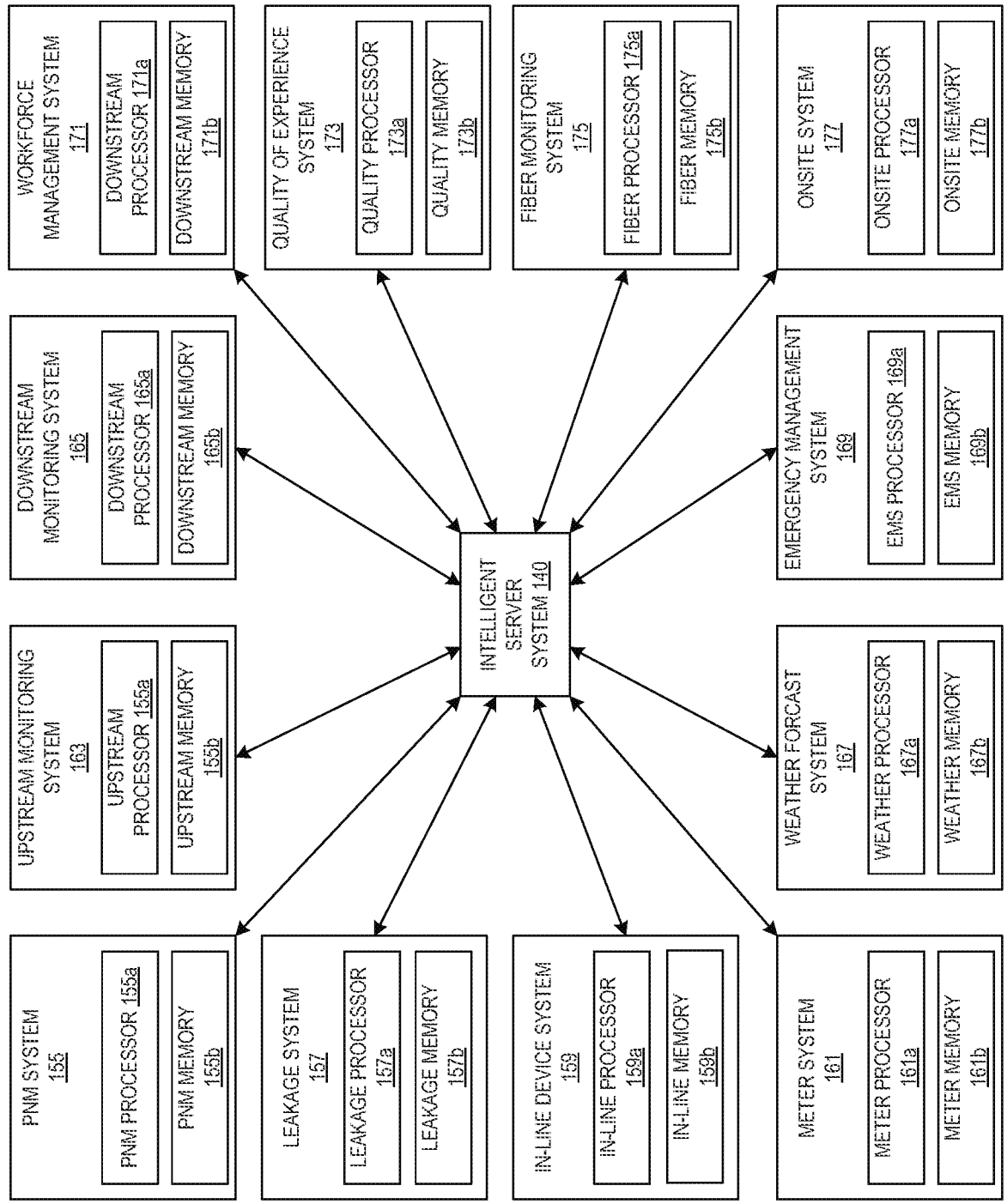
FIG. 1B is block diagram of the intelligent server system in communication with a plurality of different systems with each system including a respective processor and database, according to an example of the present disclosure.

FIG. 1B is block diagram of ISS 140 in communication with a plurality of different systems, with each system including a respective processor of processors 155a-177a and memories 155b-177b, which may include other storage or databases, according to an example of the present disclosure. According to an example, ISS 140 may obtain data from each of the respective systems, or may issue commands to control the respective systems to obtain and provide the requested data and store the data in server database 146.

According to an example, ISS 140 receives instructions from PNM system 155 to create a master service record in response to a service issue identified by PNM system 155. The service issue may relate to a reduction in performance or loss of service in CP 106 or a terminal device, such as a CM 104. PNM system 155 also provides data, set forth in greater detail below, to predict and reduce a mean time between failures (MTBF) of network elements in CP 106. The service issue identified by PNM system 155 may result from PNM data received in response to CP testing in cooperation with field technician testing. Alternatively, the service issue identified by PNM system 155 may result from periodic polling or passively receiving PNM data from CMs and other devices in the CP. The PNM system 155 may optionally prioritize polling of PNM data in response to a QoE generated service call from a customer. According to an example, QoE service calls may be correlated with affected terminal devices and network elements and integrated into PNM system 155.

ISS 140 communicates with leakage system 157 to obtain leakage data, also referred to as leakage metrics, for storage in leakage database 156. ISS 140 communicates with in-line device system 159 to obtain in-line device data which may be stored in in-line device database 158. ISS 140 communicates with meter data system 161 to obtain meter data. ISS 140 communicates with upstream monitoring system 163 to obtain upstream monitoring data and communicates with downstream monitoring system 165 to obtain downstream monitoring data. Likewise, ISS 140 communicates weather forecast system 167 to obtain weather forecast data and communicates with emergency management system 169 to obtain emergency management system data. According to an example, ISS 140 communicates with workforce management system 171 to obtain workforce management data and communicates with QoE system 173 to obtain quality of experience data. ISS 140 may also communicate with fiber monitoring system 175 to obtain fiber monitoring data and communicate with on site system 177 to obtain on site system data.

According to an example, ISS 140 may implement software-defined networking (SDN) technology as an approach to network management. SDN enables dynamic, programmatically efficient network configuration in order to improve network performance and monitoring, making it more like cloud computing than traditional network management. SDN is meant to address the fact that the static architecture of traditional networks is decentralized and complex while current networks require more flexibility, ease of data communication, and ease of troubleshooting. SDN centralizes network intelligence in one network component by disassociating the forwarding process of network packets (data plane) from the routing process (control plane). The control plane includes one or more controllers or servers, which are considered the deep brain of the SDN network where the whole intelligence is incorporated. According to an example, architectural components of the SDN may include SDN Applications, SDN Controllers, SDN Datapaths, SDN Control to Data-Plane Interfaces (CDPD, SDN Northbound Interfaces (NBI). SDN Applications are programs that explicitly, directly, and programmatically communicate their network requirements and desired network behavior to the SDN Controller via a northbound interface (NBI). The SDN Controller is a logically centralized entity in charge of translating the requirements from the SDN Application layer down to the SDN Datapaths and providing the SDN Applications with an abstract view of the network (which may include statistics and events). An SDN Controller may include one or more NBI Agents, the SDN Control Logic, and the Control to Data-Plane Interface (CDPI) driver. The SDN Datapath is a logical network device that exposes visibility and uncontested control over its advertised forwarding and data processing capabilities. The SDN CDPI is the interface defined between an SDN Controller and an SDN Datapath, which, according to an example, provides programmatic control of all forwarding operations, capabilities advertisement, statistics reporting, and event notification. SDN NBIs are interfaces between SDN Applications and SDN Controllers and typically provide abstract network views and enable direct expression of network behavior and requirements.

According to another example, ISS 140 may implement a data lake format. According to an example, a data lake is a system or repository of data stored in its natural/raw format, usually object blobs or files. A data lake may be a single store of all enterprise data including raw copies of source system data and transformed data used for tasks such as reporting, visualization, advanced analytics and machine learning. A data lake can include structured data from relational databases (rows and columns), semi-structured data (comma-separated values (CSV), logs, Extensible Markup Language (XML), JavaScript Object Notation (JSON)), unstructured data (emails, documents, Portable Document Format objects (PDFs)) and binary data (images, audio, video, testing data, polling data). According to an example, a data lake is established "on premises" as part of server database 146 of ISS 140. Alternatively, the data lake may reside "in the cloud," utilizing off premises cloud services from vendors such as Amazon, Google and Microsoft. By convention, a data lake includes raw data and transformed data suitable for use by ISS 140, while a data swamp denotes a deteriorated and unmanaged data lake that is either inaccessible for its intended use or provides little value.

Referring again to PNM system 155, server database 146 of ISS 140 1 may be populated by the PNM system 155 shown in FIG. 1B. According to an example illustrated in FIG. 1B, ISS 140 communicates with PNM system 155 to receive PNM data. In general, PNM is the process and mechanism of measuring and assessing network conditions of the CP 106 to determine error or fault conditions before becoming service impacting. The PNM system 155 leverages CMTS 150 and CM 104 features and capabilities to enable measurement and reporting of network conditions such that undesired impacts, such as plant equipment and cable faults, interference from other systems and ingress, can be detected and measured. With this information, the PNM system 155 provides modifications necessary to improve conditions and monitor network trends to detect when network improvements are needed. In general operation of the PNM system 155, and unless specified by a condition such as field testing, CM 104 makes all PNM measurements while in service, without suspending normal operational modes or data transmission and reception. Likewise, unless otherwise specified, the CMTS 150 makes all PNM measurements while in service, without suspending normal operational modes or data transmission and reception. According to an example, specified timestamping of PNM measurements is done with nominal accuracy of 100 milliseconds (ms) or better.

PNM data in PNM database 154 is obtained from a PNM system 155 that monitors, maintains, and troubleshoots CP 106 and CMs 104. As set forth in greater detail below, live spectrum and QAM analyzers provide feedback on field issues, such as detection of pervasive fast impulse noise. QAM analyzers update multiple times per second to provide nearly instantaneous feedback to a service technician. An example may be as simple as determining an impact on codeword error rates from tightening a connector or wiggling a drop cable. A PNM system continuously monitors spectral and packet health, and provides alarms in response to critical issues and trending data to thereby spot impending issues before QoE issues are impacted at a service location. A PNM system may quantify HFC maintenance data in view of CP and CM hardware, may support software upgrades, and may support transitioning to Remote PHY or upgrading from DOCSIS 3.0 to 3.1. Also, PNM system 155 may provide upstream signal demodulation, analysis, and MAC address filtering at the headend.

According to an example, a PNM sweep is a method to acquire PNM data by PNM system 155 without the use of test instrument 111 and without service interruption. A PNM sweep, also known as a PNM return sweep, may use upstream pre-equalization to remotely detect and localize impedance mismatches. A PNM sweep may be executed by test module system 142, ISS 140, or a dedicated PNM server. The PNM sweep may simplify the identification of CP subsections 106a-106t needing maintenance by capturing pre-equalization responses, grouping CMs 104 or other network elements that have statistically similar responses, and correlating grouped CMs 104 and network elements to a plant map to find the least common denominator component. In this way, a PNM sweep may be used for maintenance prioritization while generating PNM data to be stored in PNM database 154. The PNM data may then be used for analysis by ISS 140. DOCSIS 3.1 adds upstream symbol capture to the PNM sweep. In this case, CMTS 150 captures a specific symbol transmitted by CMs 104 and the PNM sweep solves for the difference between the known transmitted signal and the "as-received" condition to determine the frequency response of the transmission path. In other words, the PNM sweep solves for the difference between what was expected on the receive end and what was actually received. The upstream pre-equalization of PNM, and the auto-detection of downstream impairments via data from full-band capture of CMs 104, each provide PNM data to identify CP subsections and CMs with significant linear impairments. A downside to PNM sweep is that it can only cover occupied spectrum and doesn't work if DOCSIS services are down. A PNM sweep may take 30-45 seconds to generate results each time a technician makes an adjustment, which can be too slow for conducting real-time troubleshooting in the field. On the other hand, PNM sweep is ideally suited for long term monitoring and testing of CP 106 and CM 104 health.

As indicated above, PNM data may include a number of key metrics including equalization data from CMs, and it also can capture metrics from downstream spectrum capture from CMs and upstream spectrum capture from the CMTS. Along with traditional Simple Network Management Protocol (SNMP) metrics, the upstream and downstream PNM data is used to identify physical layer impairments and can be used to determine location of the impairments, such as whether the impairment is in the subscriber's home or in the outside cable plant.

According to an example, the PNM data may be stored in CM 104 for downstream data or stored in CMTS 150 for upstream data. The downstream and upstream data may be stored in CM 104 or CMTS 150 and later transmitted to PNM database 154. This is particularly important for CM 104 because PNM data transmission itself may have an impact on CM 104 performance. According to an example, CM quality metrics may refer to upstream and downstream PNM data which may be stored in PNM database 154. Upstream PNM data may include pre-eq coefficients of CMs that are analyzed to detect service issues, and downstream PNM data is further described below. ACM quality metric may be compared to a predetermined CM threshold value to detect a service issue. Also, downstream or upstream PNM data may be used as a CM quality metric to indicate a potential need for creation of a technician work order to improve performance of a particular network element, a CM 104, or subsections of CP 106. Downstream PNM data may include Downstream Symbol Capture, Downstream Wideband Spectrum Analysis, Downstream Noise Power Ratio (NPR) Measurement, Downstream Channel Estimate Coefficients, Downstream Constellation Display, Downstream Receive Modulation Error Ratio (RxMER) Per Subcarrier, Signal-to-Noise Ratio (SNR) Margin for Candidate Profile, Downstream forward error correction (FEC) Statistics, Downstream Histogram, and Downstream Received Power. Downstream Symbol Capture provides partial functionality of a network analyzer to analyze the response of the CP 106. At CMTS 150, the transmitted frequency-domain modulation values of one full OFDM symbol before the Inverse Fast Fourier Transform (IFFT) are captured and made available for analysis. This includes the I and Q modulation values of all subcarriers in the active bandwidth of the OFDM channel, including data subcarriers, pilots, PLC preamble symbols and excluded subcarriers. This capture results in a n ti tuber of samples that depends on the OFDM channel width. For example, for 50 kHz subcarrier spacing in a 192 MHz channel with an active bandwidth of 190 MHz, 3800 samples will be captured; for 25 kHz subcarrier spacing in a 192 MHz channel with an active bandwidth of 190 MHz, 7600 samples will be captured; for 25 kHz subcarrier spacing in a 24 MHz channel with an active bandwidth of 22 MHz, 880 samples ill be captured. Likewise, at a CM 104, the received I and Q time-domain samples of one full OFDM symbol before the Fast Fourier Transform (FFT), not including the guard interval, are captured and made available for analysis. This capture wall result in a number of data points equal to the FFT length in use, time aligned for receiver FFT processing. The number of captured samples can be reduced for narrower channels if the sampling rate, which is implementation dependent, is reduced. The capture includes a bit indicating if receiver windowing effects are present in the data. As examples, for 50 kHz subcarrier spacing in a 192 MHz channel with 204.8 MHz sampling rate, 4096 samples will be captured; for 25 kHz subcarrier spacing in a 192 MHz channel with 204.8 MHz sampling rate, 8192 samples will be captured; for 50 kHz subcarrier spacing in a 24 MHz channel with a reduced sampling rate of 25.6 MHz, 512 samples will be captured.

According to an example, Down stream Wideband Spectrum Analysis (DWSA) provides a function where CM 104 provides a downstream wideband spectrum capture and analysis, and the information is later polled and transmitted to CMTS 150, Downstream NPR measurements provide a view of the noise, interference and intermodulation products underlying a portion of the OFDM signal. For NPR measurements, CM 104 provides its normal spectral capture measurements or symbol capture measurements, which permit analysis of notch depth. According to an example, a possible use case is to observe a known LTE interference occurring within an OFDM band. In this case, PNM data originating from NPR measurement may be provided to a leakage server or database, According to another example, a possible use case is to observe intermodulation products resulting from signal-level alignment issues. In this case, because the introduction and removal of a notch affects all profiles, causing possible link downtime, this measurement is generally provided during infrequent maintenance or issue testing.

Downstream Channel Estimate Coefficients are captured by CM 104, and reporting of this estimate to CMTS 150 indicates a downstream channel response. The reciprocals of the channel response coefficients are typically used by CM 104 as its frequency-domain downstream equalizer coefficients. The channel estimate consists of a single complex value per subcarrier, CMTS 150 may be configured to avoid sending all coefficients on every query. CM 104 reports its downstream channel estimate (full set or summary) for any single OFDM downstream channel upon request of CMTS 150. The Downstream Constellation Display provides received QAM constellation points for display. Equalized soft decisions (I and Q) at the slicer in put are collected over time, possibly subsampling to reduce complexity, and made available for analysis. Only data-bearing subcarriers with the specified QAM constellation are sampled such that pilot signals and excluded subcarriers within the range are ignored. By way of example, up to 8192 samples are provided for each query, and additional queries may be made to further fill in the plot. CM 104 provides capturing and reporting of received soft-decision samples, for a single selected constellation, from the set of profiles it is receiving within a single OFDM downstream channel.

Downstream Receive Modulation Error Ratio (RxMER) Per Subcarrier provides measurements of the receive modulation error ratio (RxMER) for each subcarrier at CM 104. The CM 104 measures the RxMER using pilots and Physical Layer Link Channel (PLC) preamble symbols, which are not subject to symbol errors as data subcarriers would be. Since scattered pilots visit all data subcarriers and the PLC preamble symbols are known, the RxMER of all active subcarriers in the OFDM band can be measured over time. For the purposes of this measurement, RxMER is defined as the ratio of the average power of the ideal QAM constellation to the average error-vector power. The error vector is the difference between the equalized received pilot or preamble value and the known correct pilot value or preamble value. By way of an example test case, for an ideal Additive White Gaussian Noise (AWGN) channel, an OFDM block containing a mix of QAM constellations, with data-subcarrier carrier-to-noise ratio (CNR)=35 dB on the QAM subcarriers, will yield an RxMER measurement of nominally 35 dB averaged over all subcarrier locations. If some subcarriers (such as exclusion bands) can not be measured by the CM, the CM indicates that condition in the measurement data for those subcarriers.

Signal-to-Noise Ratio (SNR) Margin for Candidate Profile provides an estimate of the SNR margin available on the downstream data channel with respect to a candidate modulation profile. According to an example, CMTS 150 sends test data to CM 104 to measure the performance of a transition profile. In addition, CM 104 implements an algorithm to estimate the SNR margin available on the downstream data channel fora candidate profile. DOCSIS 3.1, CM-SP-MULPIv3.1, MAC and Upper Layer Protocols interface Specification, available from CableLabs®, provides a suggested algorithm. CM 104 performs this computation upon request from CMTS 150 via management message.

Downstream FEC statistics are used to monitor downstream link quality via FEC itself and also related statistics. Statistics are taken on FEC codeword error events, taking into account both the inner Low Density Parity Check (LDPC) code and outer BCH error correction codes. BCH codes are a class of error correction codes named after the inventors Raj Bose, D. K. Ray-Chaudhuri, and Alexis Hocquenghem. Downstream FEC statistics are provided on each OFDM channel and for each profile being received by CM 104. For example, if CM 104 is receiving 4 downstream profiles, there will be 4 sets of FEC counters plus a set of counters for the transition profile used for an OFDM Downstream Profile Test (OPT). Profiles are provided according to the DOCSIS standard. For example in DOCSIS 3.1, profiles 1-4 provide statistics for data codewords include all codewords. For profile 5 (transition profile), statistics for data codewords include either all codewords, if Codeword Tagging is disabled; or only codewords marked with T bit=1 in the Next Codeword Pointer (NCP), if Codeword Tagging is enabled. Likewise, similar statistics are taken on the NCP and PLC, and on MAC frames. CM 104 provides downstream performance metrics on data codeword for each profile. A Downstream Histogram provides a measurement of nonlinear effects in the channel such as amplifier compression and laser clipping. A Downstream Received Power indicator provides a metric to measure the average received downstream power in a set of non-overlapping 6 MHz bands for DOCSIS 3.0 and 3.1 signals in a receive channel set (RCS) of the CM 104 including the DOCSIS 3.1 PLC. DOCSIS 3.1 is backwards compatible to DOCSIS 3.0 such that an error level in any of the above metrics exceeding a predetermined threshold value in DOCSIS 3.1 may revert communication to DOCSIS 3.0.

Upstream PNM data includes Upstream Capture for Active and Quiet Probe, Upstream Triggered Spectrum Analysis, Upstream Impulse Noise Statistics, Upstream Equalizer Coefficients, Upstream FEC Statistics, Upstream Histogram, Upstream Channel Power, and Upstream Receive Modulation Error Ratio (RxMER) Per Subcarrier. An Upstream Capture measures a response in CP 106 and provides a view of an underlying noise floor, by capturing at least one OFDM symbol during a scheduled active or quiet probe. An active probe provides the partial functionality of a network analyzer, since the input is known and the output is captured. This permits full characterization of the linear and nonlinear response of the upstream CP. A quiet probe provides an opportunity to view the underlying noise and ingress while no traffic is being transmitted in the OFDMA band being measured. The PNM system 155 selects an active CM 104 to analyze by specifying its MAC address, or requests a quiet probe measurement. CMTS 150 is capable of selecting a specified CM 104 that is transmitting, or is capable of selecting a quiet period when no CMs 104 is transmitting, for the capture. The Upstream Triggered Spectrum Analysis measurement provides a wideband spectrum analyzer function in CMTS 150 which can be triggered to examine desired upstream transmissions as well as underlying noise/interference during a quiet period. CMTS 150 provides wideband upstream spectrum analysis capability covering the full upstream spectrum of CP 106.

Upstream Impulse Noise Statistics gather statistics of burst/impulse noise occurring in a selected narrow band. A bandpass filter is positioned in an unoccupied upstream band. A threshold is set, energy exceeding the threshold triggers the measurement of an event, and energy falling below the threshold ends the event. CMTS 150 may allow the threshold to be set to zero, in which case the average power in the band will be measured. According to an example, the measurement is timestamped using a 64-bit extended timestamp which provides a resolution of 98 ns and a range of 7 minutes. CMTS 150 provides capture of statistics in a selected band, e.g., Lip to 5.12 MHz wide, and by way of example the statistics may include a timestamp of an event, duration of the event, and an average power of the event. According to an example, CMTS 150 provides a time history buffer of up to 1024 events.

Upstream Equalizer Coefficients may include CM 104 upstream pre-equalization coefficients and CMTS 150 upstream adaptive equalizer coefficients, which taken together describe the linear response of the upstream CP for a given CM 104. Summary metrics may be provided to avoid having to send all equalizer coefficients on every query. During a ranging process, CMTS 150 computes adaptive equalizer coefficients based on upstream probes, wherein these coefficients describe the residual channel remaining after any pre-equalization. CMTS 150 sends these equalizer coefficients to the CM 104 as a set of Transmit Equalization Adjust coefficients as part of the ranging process. In turn, CM 104 provides the capability to report its upstream pre-equalization coefficients (full set or summary) upon request. CM 104 also provides the capability to report the most recent set of Transmit Equalization Adjust coefficients which were applied to produce the reported set of upstream pre-equalizer coefficients. CM 104 reports a condition in which it modified or did not apply the Transmit Equalization Adjust coefficients sent to it by CMTS 150. CMTS 150 provides reporting of upstream adaptive equalizer coefficients associated with probes from a CM 104 upon request.

Upstream FEC statistics provide monitoring of upstream link quality via FEC and related statistics. Statistics are taken on codeword error events. An LDPC codeword that fails post-decoding syndrome check may be labeled "unreliable", but the data portion of the codeword may not contain bit errors. In this case, the "unreliable" codeword count will be higher than data throughput and hence pessimistic. All codewords, whether full-length or shortened, are included in the measurements. The codeword (or frame) and error counters are provided in a long number integer format (e.g., 64-bit), to avoid overflow. CMTS 150 provides FEC statistics for a specified single upstream user corresponding to a CM 104. FEC statistics may include: Pre-FEC Error-Free Codewords, i.e., the number of codewords that passed pre-decoding syndrome check; Unreliable Codewords, i.e., the number of codewords that failed post-decoding syndrome check; Corrected Codewords, i.e., the number of codewords that failed pre-decoding syndrome check, but passed post-decoding syndrome check; MAC cyclic redundancy check (CRC) failures, i.e., a number of frames that failed a MAC CRC check; a total number of FEC codewords; a total number of MAC frames; a start and stop time of analysis period, or time that snapshot of counters was taken; and a service identifier (SID) corresponding to upstream CM 104 being measured. In addition, CMTS 150 provides FEC summaries over a rolling 10-minute period for any single upstream CM 104, including: a total number of seconds, and a n umber of errored seconds (seconds during which at least one unreliable codeword occurred).

The upstream histogram provides a measurement of nonlinear effects in the channel such as amplifier compression and laser clipping. For example, laser capping causes one tail of the histogram to be truncated and replaced with a spike. CMTS 150 captures the histogram of time domain samples at the wideband front end of the receiver (full upstream band). When CMTS 150 creates an upstream histogram, the CMTS creates a two-sided histogram; that is, it encompasses values from far-negative to far-positive values of the samples.

An upstream channel power metric provides an estimate of the total received power in a specified OFDMA channel, for example at an F connector input of a line card in CMTS 150 corresponding to a given CM 104. This metric is based on upstream probes, which are typically the same probes used for pre-equalization adjustment. While digital power measurements are inherently accurate, the measurement referred to the analog input depends on available calibration accuracy. CMTS 150 provides an estimate of total received power in a specified OFDMA channel at a reference in put point for a single specified CM 104. CMTS 150 provides configurable averaging over a range at least including 1 to 32 probes. According to an example, CMTS 1450 provides upstream power measurements with a standard deviation of 0.33 dB or better under the following test conditions; fixed center frequency; probe being measured has a fixed configuration containing at least 256 active subcarriers for 4K FFT, and at least 200 active subcarriers for 2K FFT; channel is without impairments other than AWGN at 25 dB CNR; signal level is fixed at a value within ±6 dB relative to a nominal receive level of 0 decibels relative to one millivolt (dBmV); a minimum warm up time of 5 minutes before power measurements; an averaging is set to N=8 probes per measurement. According to an example, measurements to be large enough for reliable statistics are taken in succession over a period of up to 10 minutes. A standard deviation may be computed over the measurements, where each measurement is the average of N probes.

The Upstream Receive Modulation Error Ratio (RxMER) Per Subcarrier provides measurements of the upstream receive modulation error ratio (RxMER) for each subcarrier, CMTS 150 measures the RxMER using an upstream probe, which is not subject to symbol errors as in data subcarriers. For measurement, RxMER is defined as the ratio of the average power of the ideal Binary Phase-shift keying (BPSK) constellation to the average error-vector power. An error vector is the difference between the equalized received probe value and the known correct probe value. CMTS 150 provides measurements of RxMER for all active subcarriers for any single specified user in a specified OFDMA upstream channel, using probe symbols. A sufficient number of upstream probe symbols are used for a reliable estimate of RxMER.

According to an example, upstream RxMER measurements may be taken under the following conditions: channel loading consists of a single upstream OFDMA channel with no other signals; OFDMA channel being measured has a fixed configuration with a 95 MHz channel bandwidth with 95 MHz modulated spectrum and no excluded subcarriers other than at band edges; the Channel is flat without impairments other than AWGN; ALIGN level is set to two values giving data-subcarrier CNR=30 dB and 35 dB at the cable access network F connector of a receiver in CMTS 150 across all data subcarriers in the OFDMA channel; Signal level is fixed at a nominal receive level of 10 dBmV per 6.4 MHz; a minimum warm-up time of 30 minutes occurs before measurements; and measurement is done using 8-symbol RxMER probes with a skip value of 0 (non-staggered probes). According to an example, each measurement comprises a frequency average across all subcarriers of the reported time-averaged individual subcarrier RxMER values in dB, where time averaging is over the 8 symbols in a single probe. Frequency averaging can be provided by the OFDMA receiver or performed by external computation.

According to an example, server database 146 includes leakage database 156, which is populated by leakage system 157. Leakage data is obtained by detecting signal leakage in CP 106 and stored in server database 146. In an example, signal leakage is monitored in or near the 108-137 MHz aeronautical band, within which the maximum allowable leakage field strength is 20 microvolts per meter ($\mu$V/m) at a distance of 3 meters (~10 feet) from the plant. Cable leakage, also known as egress, occurs when RF signals "leak out" from CP 106 as electromagnetic waves and spread into the environment. While a CP is generally shielded from outside interference, cable signal leaks can be caused by physical damage or improper installation of CP hardware, such as a loose connector, damaged plant cables, or cracked or unterminated cables. A point of CP leakage may also be a point of ingress for exterior RF signals into the CP itself, thereby causing continuous or intermittent disruption of service. The increased bandwidth of DOCSIS 3.1 deployed in HFC CPs has resulted in an increase in signal leakage that interferes with LTE cellular signals. In laboratory experiments, signal leakage measurements as low as 0.1 microvolts per meter ($\mu$V/m) have proven sufficient to allow LTE signals to enter the subscriber network and disrupt cable services. Signal leakage may occur at a customer premises, such as in CM 104, or in CP 106 itself. Because signal leakage may present signal ingress and egress within CP shielding, signal leakage in CP 106 or even in subscriber premises and subscriber terminal devices has the potential to affect multiple subscribers.

One approach to obtaining leakage data is to monitor a subscriber premises for signal leakage, also known as "at home" monitoring. Subscriber premises monitoring may include monitoring 138 MHz and 757.5 MHz simultaneously, thereby supporting testing in both the Aeronautical and LTE frequency bands. A home signal source then replaces the cable service with two high output test carriers which pressurize the subscriber cabling to reveal any damage or points of disruption which may lead to service interruption from ingressing LTE carriers. The displayed leakage levels may be normalized by a home receiver to reflect the value of the leak at nominal systems levels within the subscriber premises. The normalized leakage levels, and any resulting reduction in signal quality, may be documented and uploaded as home leakage data and stored in leakage database 156.

Another approach to obtaining leakage data is to monitor CP 106 itself. One approach is to deploy a GPS-based leakage management system in a fleet of technician vehicles. While driving to a location or to work, the leakage management system is connected to vehicle power, an antenna, and a GPS receiver. While driving, the system automatically monitors leakage outbreaks and records the data with a time/date stamp and GPS location. When a set threshold level has been surpassed, an event including the time stamp and GPS location may be recorded and uploaded as cable leakage data in leakage database 156. If a second, higher threshold level has been surpassed, a server alarm may be triggered for expedited service to the location. An alarm may also trigger generation of an email for response in a technician service queue. Multiple leakage detection units may be mounted in the same vehicle.

According to an example, DWSA provides a function where CM 104 provides a downstream wideband spectrum capture and analysis, and the information is later polled and transmitted to CMTS 150. Downstream Noise Power Ratio (NPR) Measurement is a view of the noise, interference and intermodulation products underlying a portion of the OFDM signal. For NPR measurement, CM 104 provides its normal spectral capture measurements or symbol capture measurements, which permit analysis of notch depth. According to an example, a possible use case is to observe a known LTE interference occurring within an OFDM band. In this case, PNM data originating from NPR measurements may be provided to a leakage server or leakage database 156.

According to another example, leakage data may be obtained from PNM data from PNM database 154, In particular the above downstream NPR measurement is a view of the noise, interference and intermodulation products underlying a portion of the OFDM signal. For NPR measurement, CM 104 provides its normal spectral capture measurements or symbol capture measurements, which permit analysis of notch depth. According to an example, known LTE interference from an LTE interference source is provided and observed in a known OFDM band. DWSA is then conducted, and NPR data is calculated. The known LTE interference and the NPR measurement data is then provided as leakage data to leakage database 156. According to an example, the leakage data may also be transmitted to and stored in PNM database 154 as historical data or to provide a trigger for increased network monitoring or fault detection.

As set forth above, leakage data may be associated with: CMs 104a-104p; common network elements such as nodes 102a-102, trunk amplifier 130, line amplifiers 132, TAPs 134a-134b; and CP subsections 106a-106t. Leakage data may be obtained from PNM polling, which can be stored in PNM database 154, or may be obtained from in-line device testing, which can be stored in in-line device database 158. Likewise, leakage data may be obtained from upstream monitoring database 162 and downstream monitoring database 164, meter database 160, and fiber monitoring system database 174. Leakage data may also be obtained from workforce management database 170. In that case, leakage data may include pending work orders where known leakage has been detected, recorded, and not yet serviced. Leakage data in workforce management database 170 may also include historical leakage data, wherein a previously successful work order addressing previous leakage is recorded and correlated with affected network elements and CMs 104.

Further, historical leakage data may also be correlated with successful work orders recorded in QoE database 172, historical weather conditions from weather forecast database 166 and emergency conditions in emergency management system database 168. As set forth above, leakage penetrates the shielding of CP 106 and once penetrated may affect a number of network elements and CMs 104. Accordingly, leakage data may originate from on site system database 176, which may include current and historical leakage data corresponding to on-site premises.

According to an example, server database 146 includes in-line device database 158, which is populated with an in-line device data from in-line device system 159. In-line device data includes data received by polling a terminal device, such as a STB or CM 104, from an in-line device server or polling a CP in-line device, such as a node 102, trunk amplifier 130, or test TAPs 134a-134b. A test TAP 134 is a device that connects directly to the cabling infrastructure to split or copy packets for use in analysis, security or general network management. Instead of two switches or routers connecting directly to each other, the TAP 134 sits between the two endpoint devices connected directly to each of them. Then traffic is seen and copied, providing visibility into the networked traffic. TAPS 134 are generally passive or active. A passive TAP requires no power of its own and does not actively interact with other components of the network. The passive TAP 134 uses an optical splitter to create a copy of the signal and is sometimes referred to as a "photonic" TAP. Most passive TAPs have no moving parts, are highly reliable and do not require configuration. A passive TAP, such as a passive splitter, physically diverts a portion of the light from its original source according to a split ratio, and therefore necessarily degrades performance. An active TAP requires a power source to regenerate the signals. There is no split ratio signal degradation in an active TAP because the active TAP receives the message and then retransmits it to both the network and monitoring destinations. Active TAPs may be affected by a power outage and thereby present a point of failure. However, battery backup of active TAPs solutions may provide continuity of packet flow. In general, pro-active CP design provides active TAPs at critical infrastructure links.

According to an example, in-line device database 158 may store DOCSIS PNM data, including pre-equalization (pre-eq) data, and digital tap data (also known as equalizer tap data). According to another example, DOCSIS PNM data may be stored in PNM database 154. DOCSIS PNM was initially developed by CableLabs® to leverage the pre-eq data from CMs 104, also known as CPE, to determine where upstream impairments like micro-reflections and group delay are impacting service. Pre-eq compensates for RF issues in CP 106. When CMTS 150 sees a signal coming from a specific CM 104, CMTS 150 can determine if that signal is distorted with issues such as tilt, roll-off, or in-channel standing waves. Since CMTS 150 knows what's wrong with the signal and to what degree, it can periodically tell the specific CM 104 to "pre-distort" its signal to cancel out the effects of that impairment. In other words, CMTS 150 tells the specific CM 104 to send the inverse signal of the one originally received so that when the pre-equalized signal is received by CMTS 150 it looks much closer to an ideal signal. Enabling pre-equalization on CMTS 150 typically provides an immediate 5 to 10 dB improvement in upstream modulation error ratio (MER). Pre-eq may physically mask some metrics and parameters, such as MER/SNR, out-of-spec power levels, codeword errors and flaps (when modem connection to a headend is dropped and reconnected). However, DOCSIS PNM is able to observe and record pre-eq coefficients from multiple CMs 104, and by analyzing that data, can determine which terminal devices are working the hardest to compensate for impairments like micro-reflections and group delay. An equalizer tap is distinguished from a physical test access point, such as TAP 134. An equalizer tap is a digital tap that represents a slice or sampling point in the signal and equalization coefficients. Those slices, or equalizer taps, can then be adjusted to cancel out the linear distortion being seen by CMTS 150. Accordingly, MER/SNR, out-of-spec power levels, codeword errors, flaps, pre-eq coefficients, and equalizer taps may be considered in-line device data and stored by in-line device database 158.

According to an example, meter database 160 may store meter data, which may be populated by meter data system 161 and/or field-deployed technician-operated meter. Meter data may include signal level meter data obtained when a technician physically uses a meter to obtain monitoring and testing data, then uploads the data to a meter system. Upstream monitoring database 162 may store upstream monitoring data, which may be populated by upstream monitoring system 163. The upstream monitoring system 163 monitors a return path from a CM 104. The upstream monitoring system 163 checks upstream communication in CP 106 from CM 104 to headend 101 (or likewise to CMTS 150). Downstream monitoring database 164 may store downstream monitoring data, which may be populated by downstream monitoring system 165. The downstream monitoring system 165 monitors forward signal path quality and stores corresponding physical layer parameter measurements. The physical measurements may be made by a technician with a meter or an in-line device that interacts with the downstream monitoring system to monitor system health.

According to an example, weather forecast database 166 may store weather forecast data, which may be populated by weather forecast system 167. Weather data may include geographic (GEO) analytics, which combines traditional analytics with location-based information to provide greater context and perspective about the data being studied. Data can be layered on and compared between locations, measured by cities, regions, and countries, and manipulated to offer unexpected trends and patterns. GEO analytics may be delivered by an application programming interface (API), which permits internal and third-party applications to make direct use of the location intelligence, with the additional dimension of building level resolution location information. Weather data may also include GEO performance data. GEO performance data generally relates to data powered by a network integrated test, real-time analytics, and system optimization. GEO performance data may use location intelligence to update planning of CP 106 and document performance engineering data.

Weather forecast data may include a number of land-based, radar or model datasets produced by the National Oceanic and Atmospheric Administration (NOAA) National Centers for Environmental Information. The National Digital Forecast Database (NDFD) is a suite of products generated by the National Weather Service (NWS) using data from regional NWS Weather Forecast Offices (WFOs) and the National Centers for Environmental Prediction (NCEP). Forecast products locally generated at WFOs are digitally entered into the NDFD. According to an example, the weather forecast system may be controlled and populated by the aforementioned governmental agencies and the weather forecast data may be communicated to ISS 140 through periodic or near instantaneous polling.

According to an example, emergency management system database 168 may store emergency management data, which may be populated by the Emergency Alert System (EAS). The EAS is a national public warning system commonly used by state and local authorities to deliver important emergency information, such as weather and AMBER alerts, to affected communities. EAS participants—radio and television broadcasters, cable systems, satellite radio and television providers, and wireline video providers— deliver local alerts on a voluntary basis, but they are required to provide the capability for the President to address the public during a national emergency. The Federal Emergency Management Agency (FEMA), the Federal Communications Commission (FCC), and the NWS work collaboratively to maintain the EAS and Wireless Emergency Alerts (WEA). The EAS and WEA are the two main components of the national public warning system and enable authorities at all levels of government to send urgent emergency information to the public.

According to an example, workforce management system database 170 may store workforce management system data, which is populated by workforce management system 171. The workforce management system 171 generates workflows to manage a technician with in a unified platform. Workforce management system 171 may also provide direct test instrument uploads, provide instrument management for software and firmware upgrades, monitor and update configurations and test plans, and generate reports resulting from technician service. Workforce management system database 170 may store historical and statistical data corresponding to mean time between failures (MTBE) of network elements, which may be a predicted average time between failures. Workforce management system database 170 may also store historical and statistical data corresponding to a mean time to repair (MTTR) a failed network component.

According to an example, QoE database 172 may store QoE data, which is populated by QoE system 173 and may include customer feedback. QoE system 173 may also proactively monitor QoE for voice over LTE, provide targeted Radio Access Network (RAN) optimization based on geo-location, application and financial metrics, device-aware heterogeneous network optimization, and monitoring QoE for video. According to an example, QoE database 172 may be integrated, in whole or in part, with PNM database 154, and may be controlled with a unified system.

According to an example, fiber monitoring system database 174 may store fiber monitoring data from fiber monitoring system 175. Fiber monitoring system 175 may include an optical time domain reflectometer (OTDR) to characterize an optical fiber. An OTDR injects a series of optical pulses into a fiber Under test and extracts, from the same end of the fiber, light that is scattered (Rayleigh backscatter) or reflected back from points along the fiber. An OTDR may use course wavelength division multiplexing in multiple wavelengths to determine wavelength routes or pin point faults. An OTDR may determine a fault location in an optical fiber without disrupting traffic on active channels. Data originating from the OTDR may be stored as the fiber monitoring data.

Figure 1C:
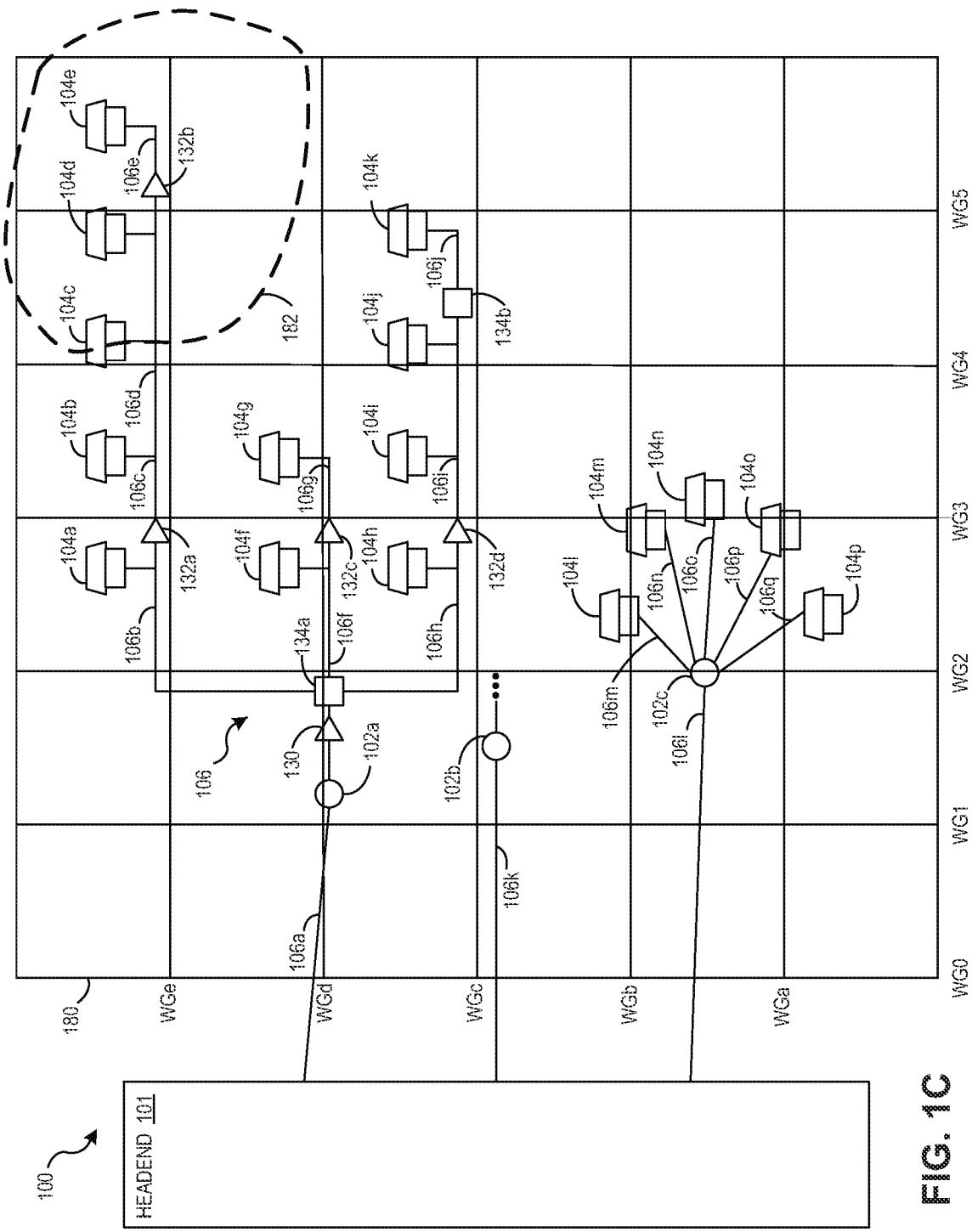
FIG. 1C is a schematic diagram of a cable network illustrating a weather data overlay including a weather pattern, according to an example of the present disclosure.

According to an example, on site system database 176 may store on site system data. The on site system database may be populated by on site system 177. The onsite system data may in elude data from custom systems resident at a service location. For example, an office building housing hundreds of workstations or computer terminals may maintain an on site system database. FIG. 1C is a schematic diagram of cable network 100 illustrating a weather data overlay 180 including weather pattern 182, according to an example of the present disclosure. Weather data overlay 180 is a grid that provides a schematic overlay of CP 106. According to an example, the grid of weather data overlay is divided into sections along a horizontal axis, having lines WG0-WG5, and divided along a vertical axis, having lines WGa-WGe. Accordingly, a particular section of weather data overlay may be denoted as WGx, WGy, wherein "x" refers to numbers 1-5 and "y" refers to letters a-e. As illustrated, weather pattern 182 directly affects CP subsections, network elements, and CMs 104. In particular, weather pattern 182 affects grid sections WG4, WGe; WG5, WGe; WG4, WGd; and WG5, WGd. Network elements and CMs 104 denoted in the above grid sections include line amplifier 132b, CM 104c, CM 104d, and CM 104e. CP subsections affected include sections 106d and 106e. According to an example, weather data may be polled from a weather service and may be recorded. Historical weather data may also be recorded with time and data stamps. Likewise, forecast weather data may be recorded with time and date stamps and updated in response to changes in weather conditions. Weather data may include weather conditions corresponding to weather metrics or weather metrics themselves. Weather conditions generally relate to observed weather conditions as would be observed by a field technician, such as light or heavy rain or light or mild wind. Weather metrics may correspond to, for example, an amount of precipitation such as 3 inches of rain per hour or a wind speed of 20 miles per hour. Table 1 summarizes the data as follows:

TABLE 1

Example Weather Data Directly Impacting CP 106

| Grid Sections with Weather Pattern | Network Elements Impacted | Weather Conditions or Weather Metrics. |
| --- | --- | --- |
| WG4, WGe | CM 104f, CM 104d | heavy rain; light wind |
| WG5, WGe | CM 104e, LA 132b | heavy rain; light wind |
| WG4, WGd | | heavy rain; light wind |
| WG5, WGd | | heavy rain; light wind |

The above weather data, which may be current, historical, or forecast, may be analyzed by IS 144 and correlated with other system data to determine the historical effect and the potential for future or imminent pact on network elements and CMs 104 in CP 106.

According to an example, the weather data from Table 1 may be correlated with CP section 107 of FIG. 1, which is related to a service issue for CM 104d. CP section 107 includes CMs 104a-104e, node 102a, trunk amplifier 130, TAP 134a, line amplifiers 132a and 132b, and CP subsections 106a-106g. FIG. 1C illustrates that weather pattern 182 affects grid sections WG4, WGe; WG5, WGe; WG4, WGd; and WG5, WGd. Table 2 summarizes the data as follows:

TABLE 2

Example Weather data Potentially Impacting CP section 107

| Grid Sections with Weather Pattern | Network Elements Directly Impacted by Weather | Weather Conditions or Weather Metrics | Network Elements Potentially Impacted by Weather |
|---|---|---|---|
| WG1, WGe | | | CP 106b |
| WG2, WGe | | | CP 106b, CM 104a, LA 132a |
| WG3, WGe | | | CP 106c, CP 106d, CM 104b |
| WG4, WGe | CM 104f, CM 104d | heavy rain; light wind | |
| WG5, WGe | CM 104e, LA 132b | heavy rain; light wind | |
| WG0, WGd | | | CP 106a |
| WG1, WGd | | | node 102a, TA 130, TAP 134a, CP 106d |
| WG4, WGd | | heavy rain; light wind | |
| WG5, WGd | | heavy rain; light wind | |

According to an example, CP section 107 of FIG. 1, which is related to a service issue for CM 104*d*, is first determined. Next, grid sections with a weather pattern are determined. Next, the data is correlated because relatively small faults or leaks in network elements of CP 106, even if not directly impacted by weather, may provide a cumulative impact affecting a number of different network elements. According to an alternative example, historical weather data is obtained and cross-correlated with PNM data or leakage data to determine a potential future impact.

Figure 1D:
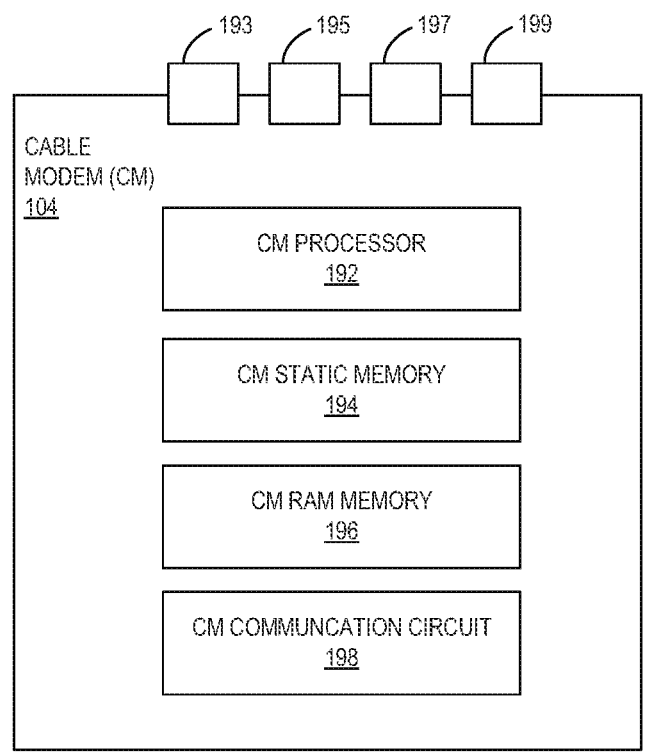
FIG. 1D is block diagram of a CM, according to an example of the present disclosure.

FIG. 1D is a block diagram of a cable modem, e.g., CM 104, according to an example of the present disclosure. CM 104 includes CM processor 192, CM static memory 194, such as an electrically erasable programmable read-only memory (EEPROM), CM random access memory (RAM) 196, and CM communication circuit 198. CM 104 also includes RF input port 193, LAN port 195, connected device port 197, and test port 199. According to an example, connected device port 197 provides direct support for a connected device, such as a television set top box. Test port 199 provides access to CM parameters and metrics directly from CM 104 and may be used during testing. CM static memory 194 stores firmware for directly controlling operation of CM 104, and CM RAM memory 196 stores operational CM data that may be polled by CMTS 150 or may be accessed during test. CM communication circuit 198 manages protocols and device communication with CMTS 150, and CM ports.

Figure 2:
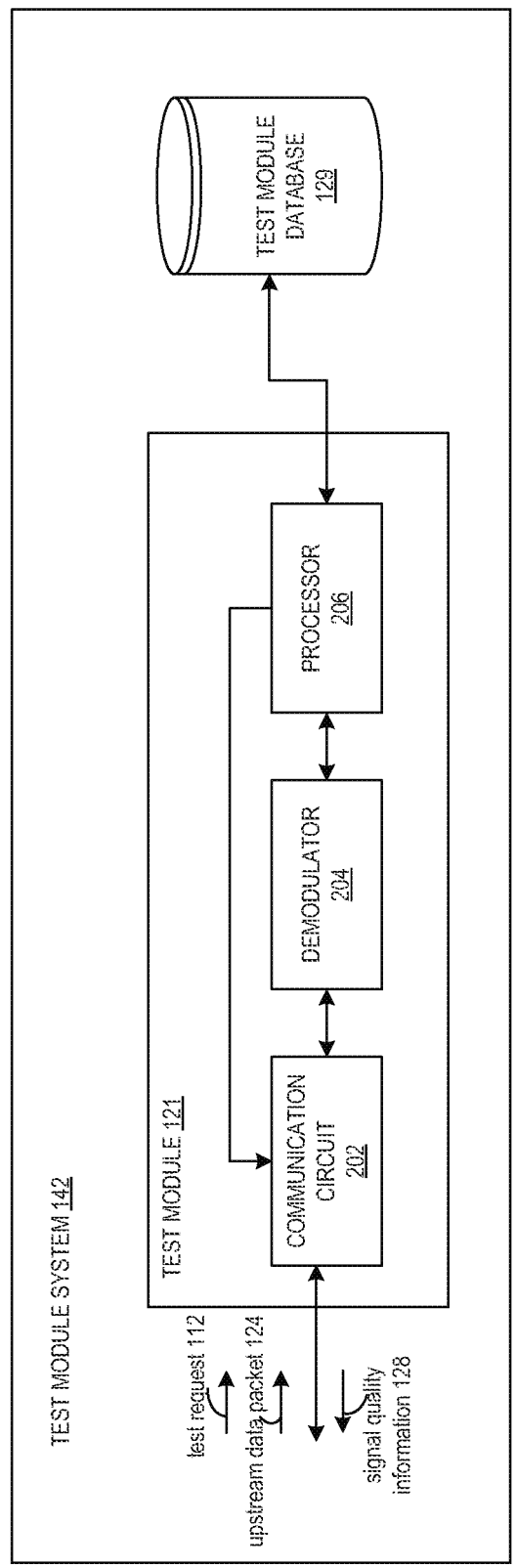
FIG. 2 is a block diagram of the test module system which may be located at the headend of the cable network, according to an example of the present disclosure.

FIG. 2 is a block diagram of test module system 142 which may be located at headend 101 of cable network 100. In an example, test module system 142 and test instrument 111 may be used to capture some PNM data but in other examples PNM data can be captured automatically without test instrument 111, such as by pre-eq coefficients.

Regarding obtaining PNM data in combination with test instrument 111, test module 121 includes a communication circuit 202 for receiving the test request 112 and the upstream data packet 125, a demodulator 204 coupled to the communication circuit 202 for demodulating the upstream data packet 125, and a processor 206 coupled to the demodulator 204 and to the communication circuit 202. Processor 206 calculates signal quality parameters of the demodulated upstream data packet and sends, through the communication circuit 202, signal quality information 128 back to test instrument 111.

Herein, the term "signal quality information" means a QAM quality parameter or information related to quality of an upstream signal. The signal quality information 128 may include, by way of a non-limiting example, MER, in-band frequency response, in-band group delay, micro-reflections, impulse noise, a number of captured symbols in the upstream data packet, a number of erroneously detected symbols in the upstream data packet, a constellation map, and an RF power level. The measured frequency response may be corrected for pre-equalization used by the selected terminal device to transmit the upstream data packet 125. Advantageously, combining QAM quality information with the frequency response corrected for pre-equalization provides an operator of the test instrument 111 with a broad, multi-level set of data sufficient for troubleshooting most upstream path problems.

According to an example of the disclosure, the pre-equalization coefficients are stored in test module database 129, which is also located at the headend 101. The database 129 associates the CMs 104 connected to the cable network 100 with pre-equalization coefficients that have been sent by the CMTS of the headend 101 to the CMs 104 for use in generation of the upstream signals 110. Upstream signal pre-equalization is a part of the DOCSIS communication protocol.

Figure 3:
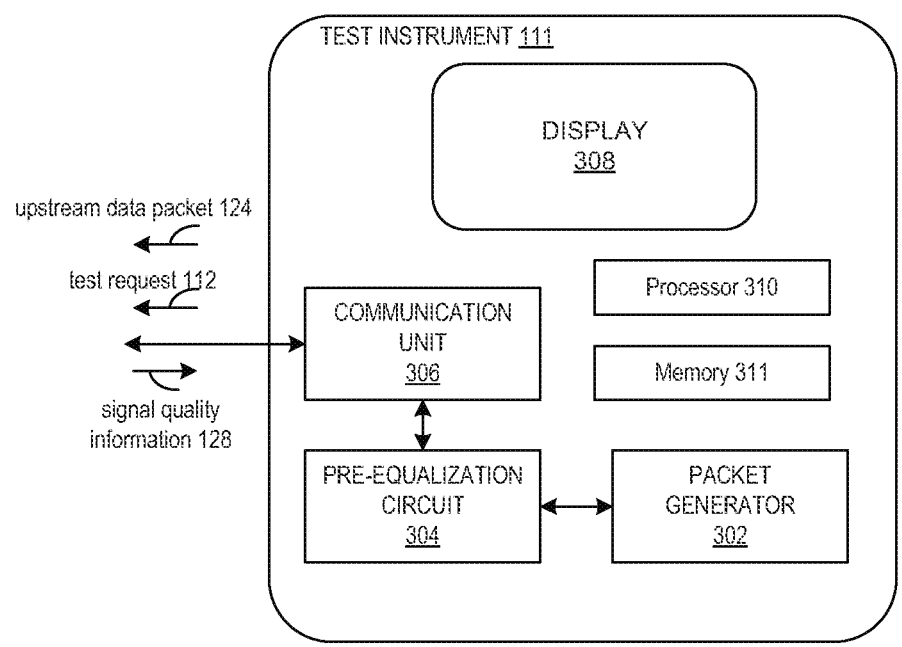
FIG. 3 is a block diagram of the test instrument, according to an example of the present disclosure.

FIG. 3 is a block diagram of test instrument 111, which is used with test module 121 to acquire PNM data and other data according to an example of the disclosure. Test instrument 111 includes a processor 310 and memory 311, The processor 310 may execute machine readable instructions stored in memory 311 to perform testing functions described herein. Test instrument 111 includes a packet generator 302 for generating the upstream data packets, including upstream data packet 125, a pre-equalization circuit 304 coupled to packet generator 302, for pre-equalizing the upstream data packets, a communication unit 306, coupled to pre-equalization circuit 304, for communicating pre-equalization coefficients to the test module 121 at headend 101, and a display 308 for displaying the received pre-equalization signal quality information 128.

A technician wishing to test the upstream path at one of the nodes 102 of the cable network 100, connects the test instrument 111 to the selected node 102 and causes the test instrument 111 to send the test request 112 to the test module 121. The test request 112 contains an identifier, such as a MAC address, of a device that generates the upstream data packet 125 to be captured and demodulated by the test module 121. The technician can select a MAC address of one of the CMs 104 of the cable network 100, depending on which of the nodes 102 is being tested. In one example, CMs 104 generate the upstream data packets as a part of their normal operation. In another embodiment, CMs 104 are configured to send a "test" upstream data packet in response to receiving a request from headend 101. The headend 101 generates this request in response to a command from the test instrument 111. Alternatively or in addition, the technician can select the test in 111 itself to be the source of the test upstream data packets. In this case, the upstream data packet 125 will be automatically generated by the test instrument 111 shortly after issuing the test request 112.

The test request 112 is received by the test module 121. Upon receiving the test request 112, the test module 121 starts capturing and demodulating upstream data packets. Demodulated packets are screened fora device identifier contained in the test request 112. Upon finding the packet with a matching device identifier, the processor 206 calculates the signal quality information 128, which can be corrected mathematically for pre-equalization used in the transmission of the upstream data packet 125. This is more beneficial than sending the upstream data packet 125 not pre-equalized, because the un-equalized upstream data packet 125 may arrive too distorted for the demodulation to work, in which case no QAM quality information could be measured at all. As noted above, the pre-equalization coefficients can be obtained from test module database 129. In an example where the test instrument itself generates the upstream data packet, the pre-equalization coefficients can be supplied by the test instrument 111. For example, the pre-equalization coefficients can be included in the payload of the upstream data packet 125. After demodulation of the upstream data packet 125, these coefficients will be obtained by processor 206, which can use them to correct the signal quality information 128 for pre-equalization.

In one example, the obtained signal quality information 128 is communicated to the test instrument 111. The technician observes the test results on the display 308 of the test instrument 111. Advantageously, this provides a real-time feedback for the technician performing repairs in the field. In another example, the test module 121 keeps performing tests and accumulating results at the headend, to be observed by the technician at a later time at the headend or elsewhere in the field, using a Web browser interface connected to the Internet. The signal quality information 128 along with testing parameters, network element topography, and obtained test results are communicated to ISS 140 and logged as a report.

Figure 4A:
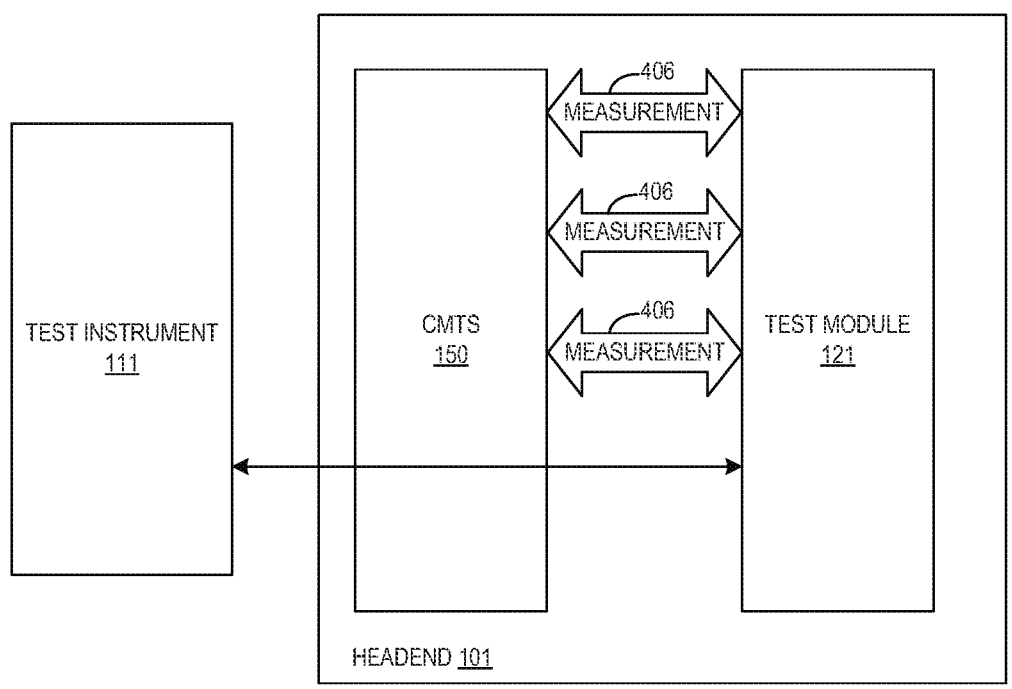
FIG. 4A is a block diagram showing a connection between the test instrument, a test module, and a CMTS, according to an example of the present disclosure.

FIG. 4A is a block diagram showing a connection between test instrument 111, test module 121, and CMTS 150. According to an example, test instrument 111 establishes a line of communication 402 with the test module 121. The test module 121 performs measurements 406 of various signals in a CMTS 404, to obtain the signal quality data. The line of communication 402 can be formed based on a service DOCSIS channel, an out-of-band (OOB) service channel, or, if time permits to make such a connection, a separate regular DOCSIS bidirectional communications channel.

Figure 4B:
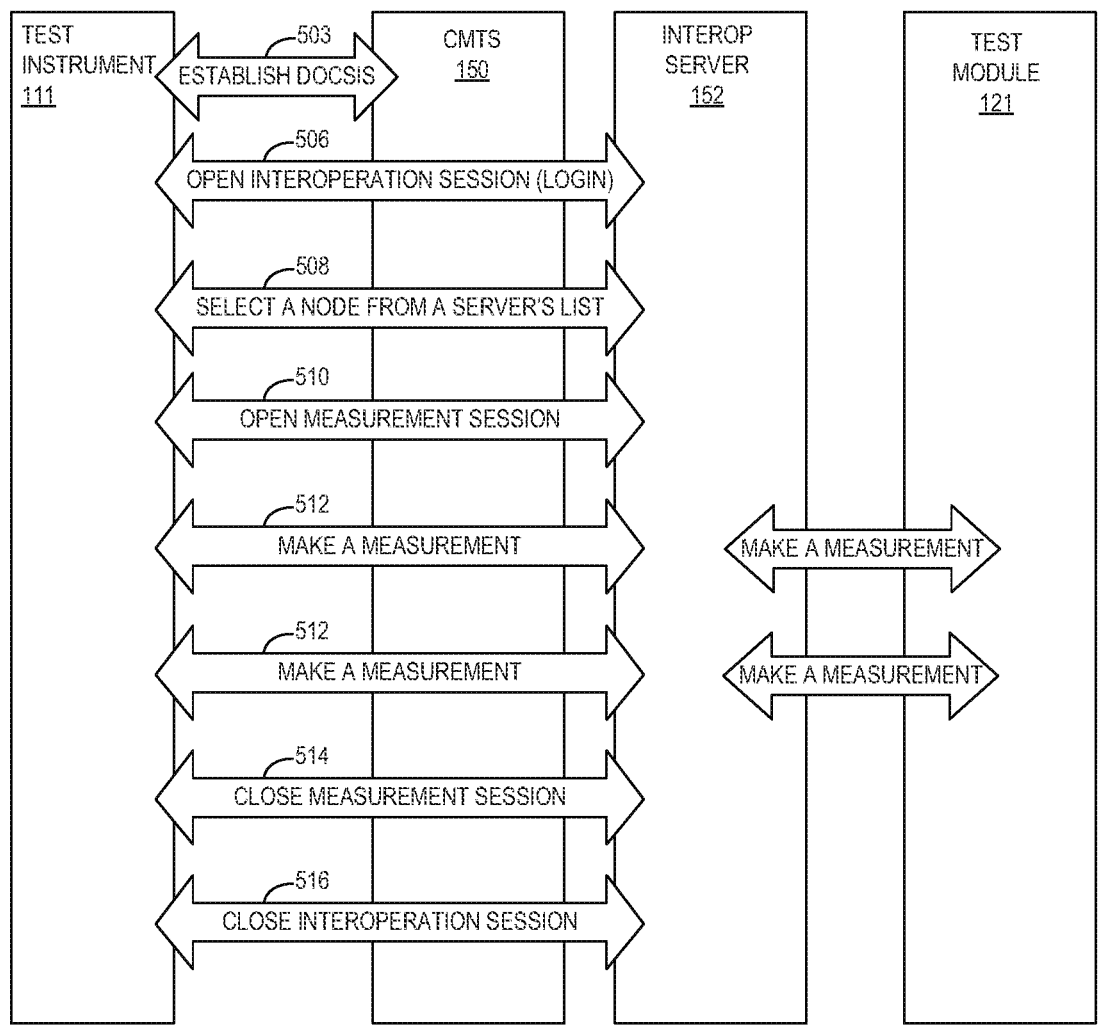
FIG. 4B is a block diagram of a test system for testing an upstream path, showing flow of commands between modules of the system, according to an example of the present disclosure.

FIG. 4B is a block diagram for testing an upstream path, showing flow of commands between modules of the system according to an example of the present disclosure. In FIG. 4B, the line of communication 402 of FIG. 4A is formed using a regular DOCSIS bidirectional communications channel, is illustrated in more detail. To perform signal quality measurements, the test instrument 111 first establishes a regular DOCSIS communication channel with the CMTS 150, as indicated by "Establish DOCSIS" command 503. Then, the test instrument 111 opens a TCP/IP communications session with interop server 152, as indicated by "Open Interoperation Session" command 506. The interop server 152 is a Web based application that uses a standard Web browser to communicate with the test instrument 111. Interop server 152 provides the test instrument 111 with a list of currently active nodes of the cable network 100. The user of the test instrument 111 selects a node from the list, as shown at 508, and a measurement session 510 is opened. At this point, the user can use the test instrument 111 to send specific commands 512 to the test module 121 to make measurements 515. Once all of the measurements 515 are performed, the user closes the measurement session, as indicated at 514. Then, in response to a "Close interoperation Session" command 516, the interoperation session is closed.

According to an example of the present disclosure, pre-filtering of upstream data packets at headend 101 is used to improve speed and reliability of detecting and processing the upstream data packets sent by the test instrument 111.

Figure 5:
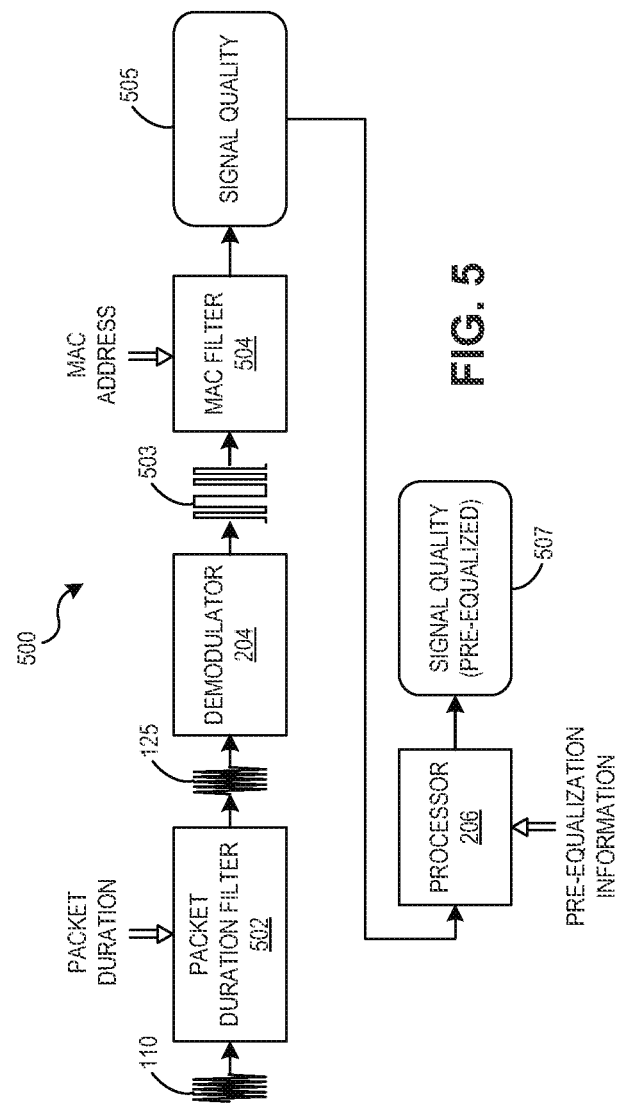
FIG. 5 is a block diagram of an upstream packet prefiltering apparatus, according to an example of the present disclosure.

FIG. 5 is a block diagram of upstream packet pre-filtering apparatus 500, according to an example of the present disclosure. Pre-filtering apparatus 500 for example is part of the test module 121 of test module system 142. The pre-filtering apparatus 500 includes a packet duration filter 502, the demodulator 204, a MAC filter 504, and the processor 206. In operation, the packet duration filter 502 filters the upstream signals 110, passing through packets having a duration of the upstream data packet 125. The upstream data packet 125 generated by the test instrument 111 passes through the packet duration filter 502 and is demodulated by the demodulator 204. The packet in digital form 503 is filtered by the MAC address at the MAC filter 504. Signal quality information 505 of the demodulated filtered packet is received by the processor 206, which calculates pre-equalized signal quality information 507 based on at least one pre-equalization coefficient used by the test in 111 to generate the upstream data packet 125.

Packet length pre-filtering can result in a dramatic improvement of the filtering speed. For example, at an upstream packet rate of 1000 data packets per second, plus 50 packets per second generated by the test in 111, and at 100 millisecond demodulation time by the demodulator 204 of the test module 121, the test module 121 will miss 99% of data packets, so that only one test data packet from the test instrument 111 will be detected every two seconds. When the packet length pre-filtering is implemented with 99% efficiency, approximately only 10 packets out of the 1000 unwanted packets will be demodulated, which results in 60 packets per second traffic arriving at the input of the demodulator 204. Out of these 60 packets, 10 will be demodulated every second, five of six of these being the upstream data packets generated by the test instrument 111. Therefore, out of the 10 demodulated packets per second, on average, approximately 8 will be the upstream data packets generated by the test instrument 111. Therefore, 8 testing-useful packets will be detected every second, which is 16 times improvement of the testing speed.

Figure 6:
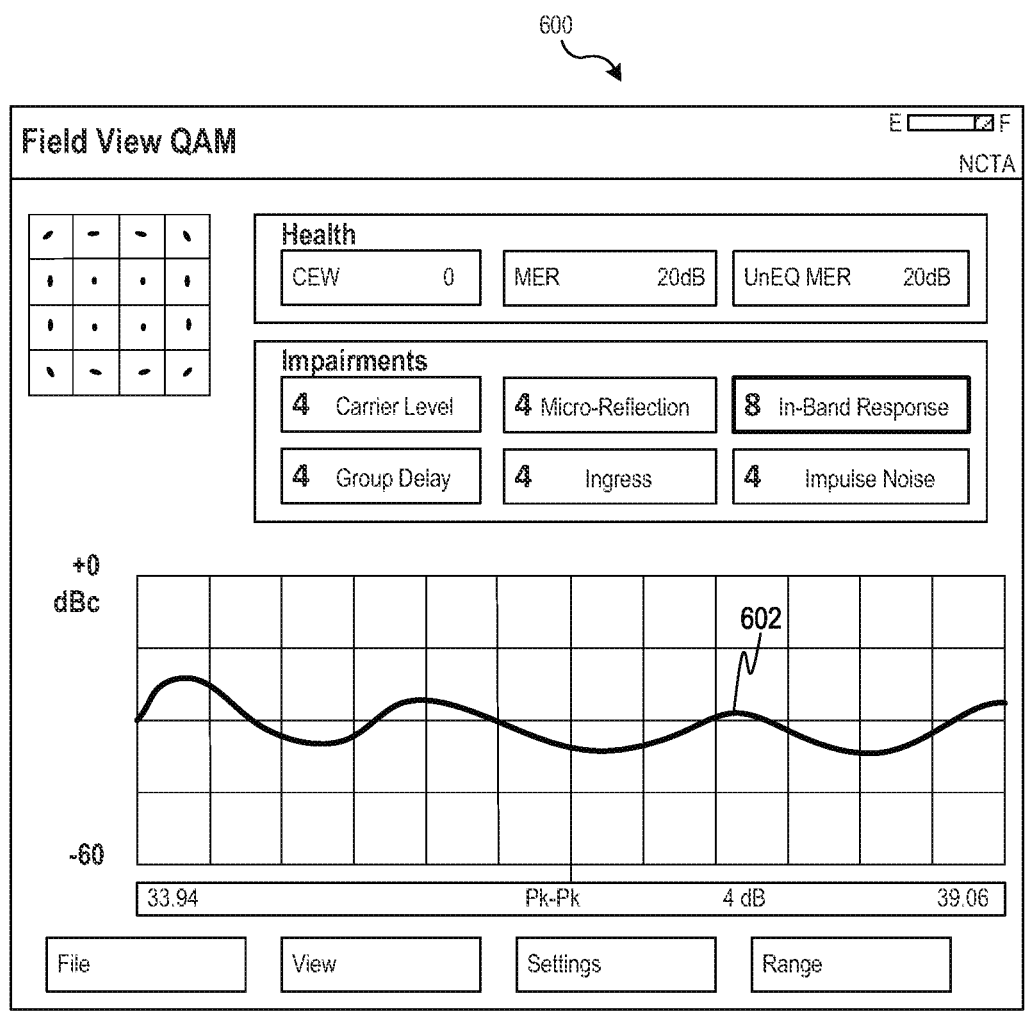
FIG. 6 is an example view of a display of a test instrument, showing signal quality information, according to an example of the present disclosure.
Figure 7:
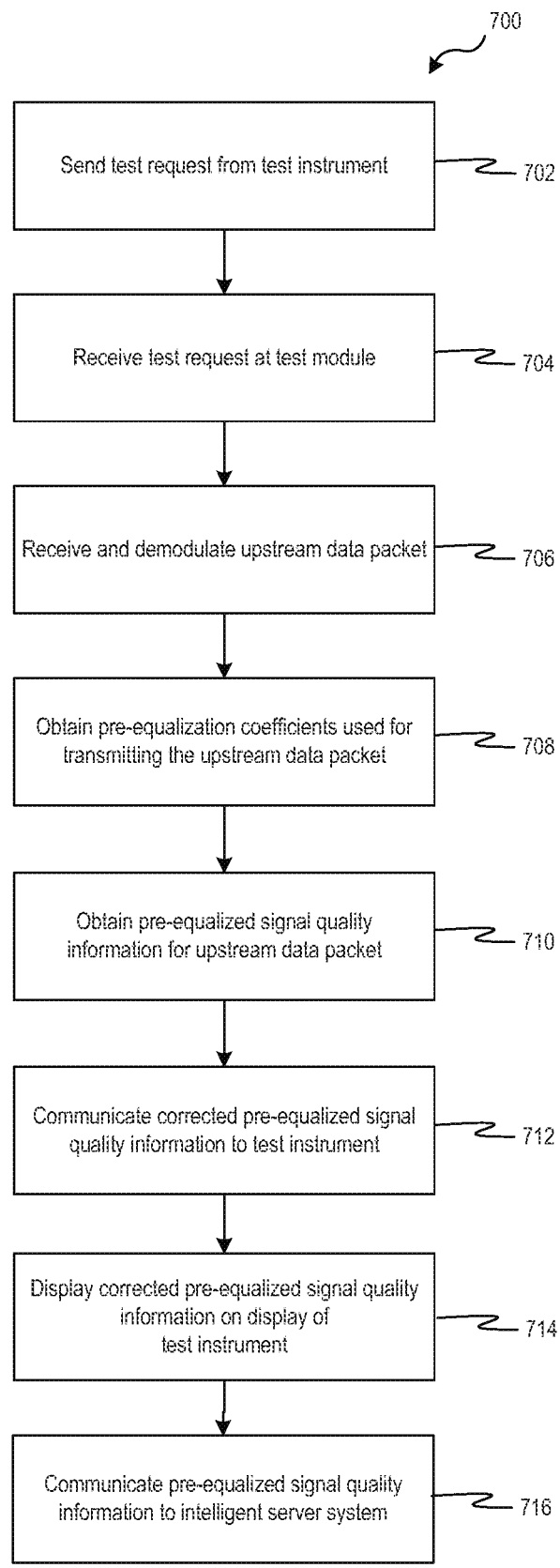
FIG. 7 is a block diagram of method of obtaining the signal quality information, according to an example of the present disclosure.

FIG. 6 is an example view of display 308 of test instrument 111, showing signal quality information, according to an example of the present disclosure. Example view 600 of display 308 shows a display of MER. MER is a measure used to quantify the performance of a digital radio (or digital TV) transmitter or receiver in a communications system using digital modulation (such as (QAM). A signal sent by an ideal transmitter or received by a receiver would have all constellation points precisely at the ideal locations, however various imperfections in the implementation (such as noise, low image rejection ratio, phase noise, carrier suppression, distortion, etc.) or signal path cause the actual constellation points to deviate from the ideal locations. Transmitter MER can be measured by equipment, which demodulates the received signal in a similar way to how a real radio demodulator does it. Demodulated and detected signal can be used as a reasonably reliable estimate for the ideal transmitted signal in MER calculation. The MER and the pre-equalized MER ("Un EQMER") are shown as equal to each other and are equal to 20 dB. The in-band response shows a spectral ripple 602, FIG. 7 is a block diagram of method 700 of obtaining the signal quality information by testing the upstream path of cable network 100 using test instrument 111, according to an example of the present disclosure. The method 700 and other methods described below are described by way of example of being performed by one or more of the test instrument 111, ISS 140, test module system 142 and/or other devices and systems described herein. At 702, the test request 112 is sent from test instrumental to the test module 121 of headend 101 to demodulate and obtain signal quality information of the upstream data packet 125 generated by test instrument 111. As set forth above, any one of the CMs 104 can also be selected at this step. The device to receive the upstream data packet 125 from is identified by a device identifier selectable by test instrument 111.

At 704, test request 112 is received by test module 121. At 706, the upstream data packet 125 generated by the test instrument 111 or one of the CMs 104, as the case may be, is received and demodulated by the test module 121. At 708, at least one pre-equalization coefficient used to transmit the upstream data packet 125 is obtained. At 710, the signal quality information of the upstream data packet is obtained. Also at 710, the signal quality information can be corrected for pre-equalization using the at least one pre-equalization coefficient obtained in 708. At 712, the pre-equalization corrected quality information 128 can be communicated to the test instrument 111, and at 714, the obtained signal quality information is displayed on the display 308 of the test instrument 111. At 716, the pre-equalization signal quality information, which may include the signal quality information corrected for pre-equalization using the at least one pre-equalization coefficient obtained in 708, is communicated to ISS 140 and stored in server database 146.

Once the upstream data packet 125 is demodulated by the test module 121, QAM quality information can be included in the signal quality information 128. The signal quality information 128 may be communicated to the test instrument 111 in a variety of ways, for example by using a dedicated DOCSIS downstream channel, or by using a DOCSIS service channel. At 806, the operation of receiving and demodulating the upstream data packet 125 may include a step of pre-filtering upstream data packets based on the packet length, as explained above, so that only upstream data packets having the target packet length are selected for the time-con su mi g step of demodulation. In one example, the target packet length is selected by obtaining a probability distribution of upstream packet lengths in the cable network, and selecting a packet length having a probability of no more than a certain value, e.g., 25% of a maximum probability of the probability distribution, as the target packet length. The target packet length has to be selected out of the set of lengths allowed by the CMTS 150 according to DOCSIS communications protocol, FIG. 8 is an example intelligent test report 800 associated with captured PNM data, according to an example of the present disclosure. Intelligent test report 800 includes initial diagnostic data including signal path health, signal path impairments, network elements affected and initial PNM data. Test report 800 illustrates, as an example, an impairment in an In-Band Response that affected Node NID189; Terminal Devices TD358, TD359, and TD340; Trunk Amplifier TA658; Line Amplifiers LA514 and LA516; and Test Access Point TAP489 in Cable Plant subsystem CP573. PNM and Leakage data included a QoE score of 7.5; an Initial Diagnosis that a problem may be "X" feet from network element TAP489; a Bit Error Ratio of $10^{-8}$; Line Amplifier LA514=5% SNR; and Leakage at Test Access Point TAP489 and in Cable Plant subsection CP573. Test report 800 also includes post service data indicating a QoE score of 9.0; repair of a connector at TAP489; and repair of cable shielding, which resulted in an improved bit error ratio of $10^{-12}$. Post service data also indicated improved performance at line amplifiers LA514 and LA516.

Figure 9A:
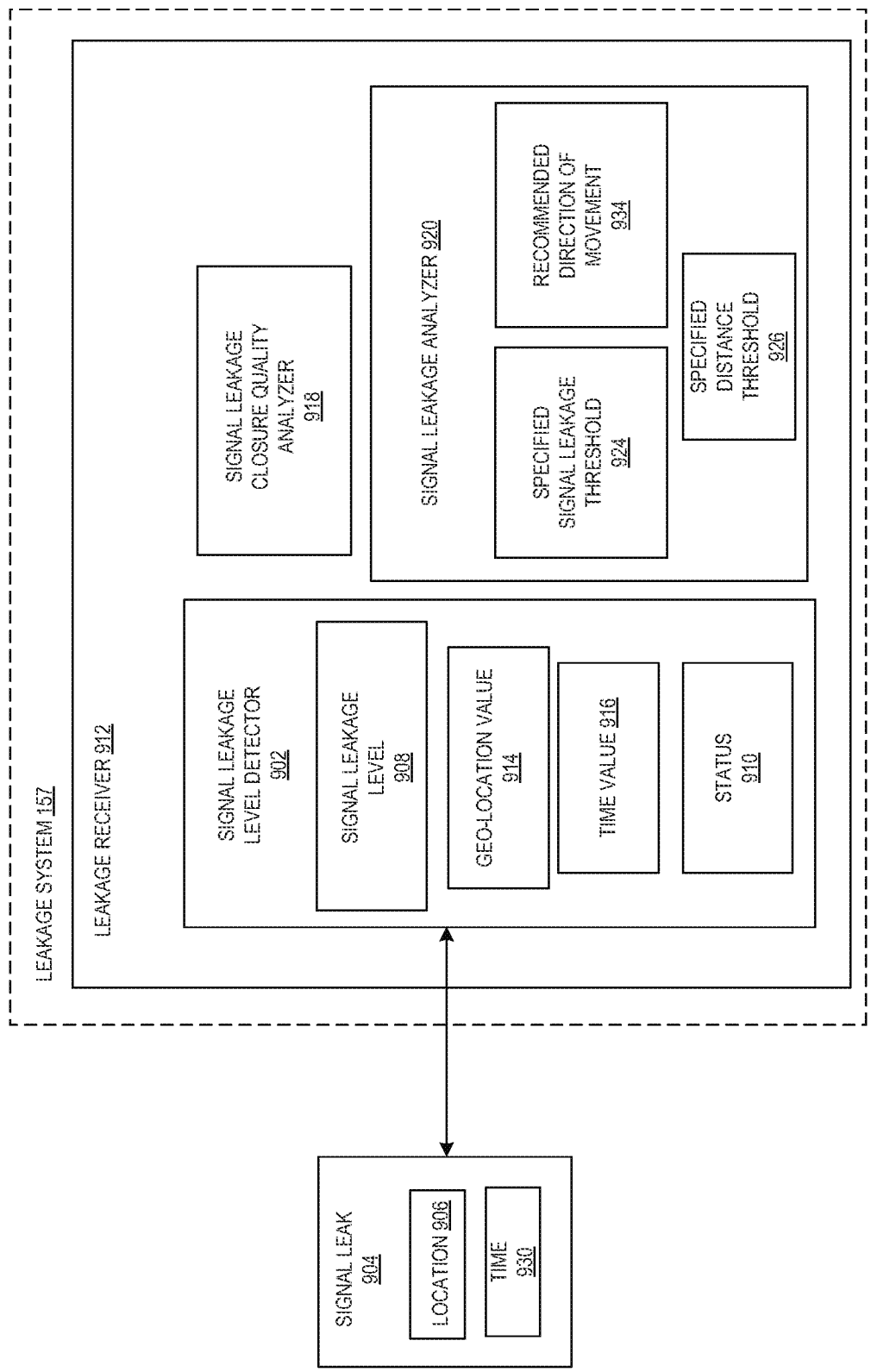
FIGS. 9A-C illustrates block diagrams of leakage systems, according to examples of the present disclosure.
Figure 9B:
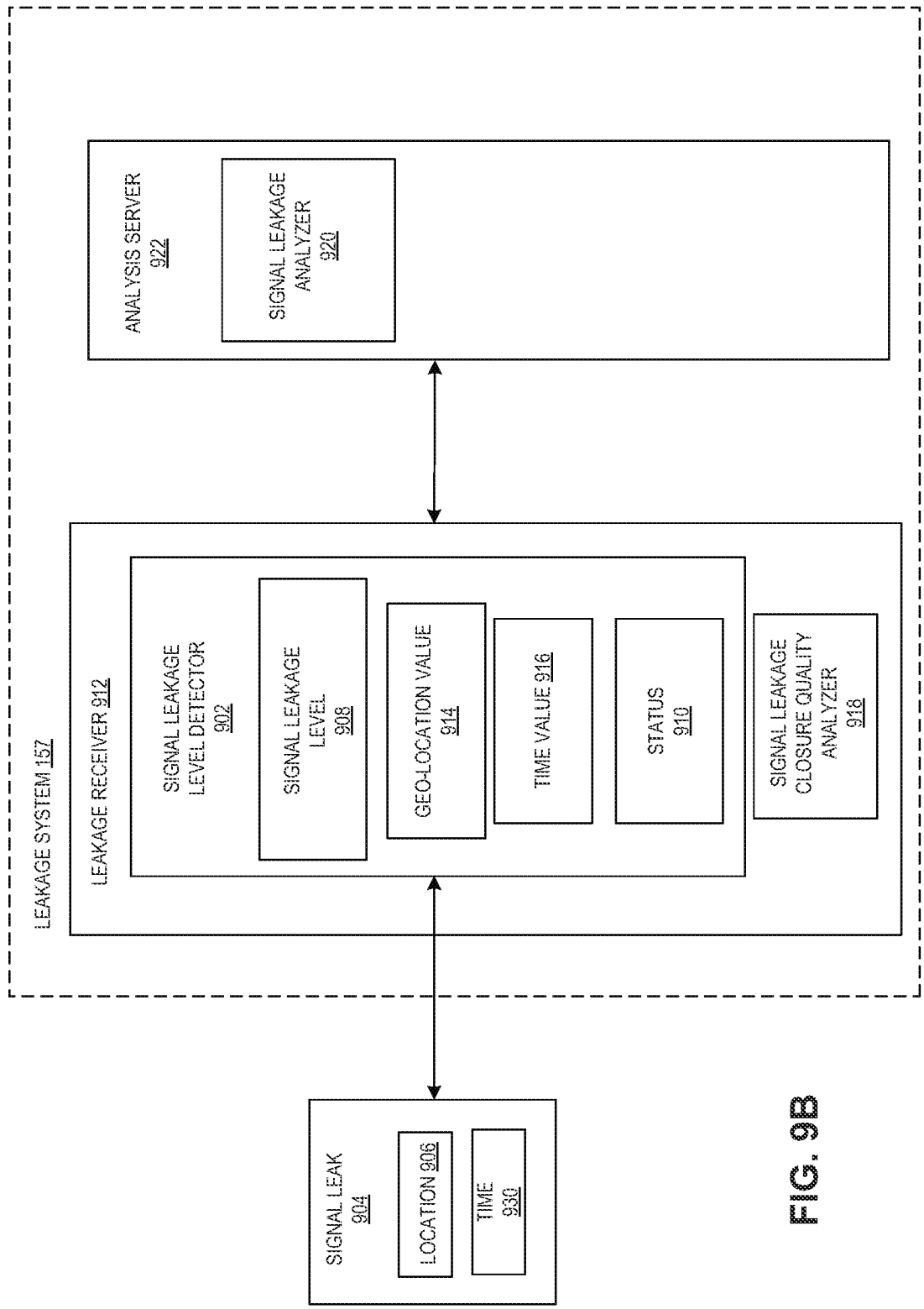
Figure 9C:
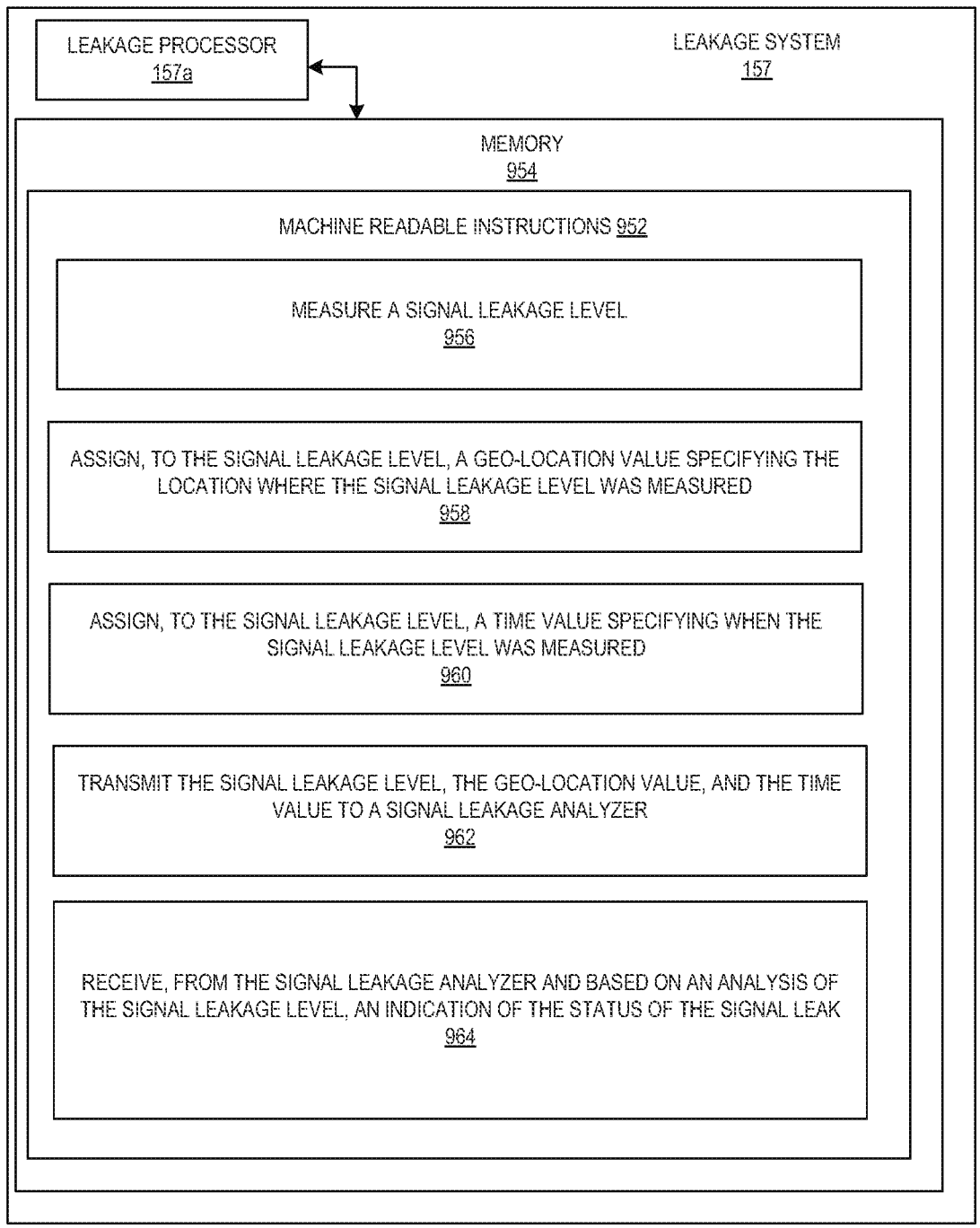

FIGS. 9A-C relate to examples of leakage system 157. With respect to leakage testing of cable network 100, a device, such as a leakage transmitter, may be utilized to generate test signals, and a leakage receiver may identify leakage points in the network. Once a leakage point is identified, a technician may perform remedial actions, such as, replacing and/or otherwise servicing part(s) of the network that are identified as including the leak. Signal leakage monitoring, methods for signal leakage monitoring, and n on-transitory computer readable media for signal leakage monitoring are disclosed herein. The systems, methods, and non-transitory computer readable media may also be used for validation, and implementation of additional actions if needed, for a repair associated with a signal leak. In this regard, the systems, methods, and non-transitory computer readable media disclosed herein provide for measuring and storing signal leakage levels in a leakage database or another such environment. In an example, once a signal leakage level is measured for a signal leak that has been presumably addressed (e.g., by remedial actions as disclosed herein), the signal leakage level may be compared to a specified signal leakage threshold to determine whether the signal leak status should remain open (e.g., where the signal leak is considered an active or unresolved signal leak) or whether the signal leak status should be closed (e.g., where the signal leak is considered an inactive or resolved signal leak). If the specified signal leakage threshold is met, the signal leak may be closed, for example, in the leakage database 156.

With respect to leakage testing of cable network 100, a device, such as a leakage transmitter, may be utilized to generate test signals, and a leakage receiver may identify leakage points in the network. Once a leakage point is identified, a technician may perform remedial actions, such as, replacing and/or otherwise servicing part(s) of the network that are identified as including the leak. In this regard, it is technically challenging for the technician to substantiate in near-real time the quality of the remedial actions taken that validate the closure of the signal leak. For example, if the signal leak is not properly remedied but closed anyway, a technician may need to re-visit the leak site to perform further remedial actions. The leakage point may also need to be identified again before remedial action can occur, further delaying the closing of signal leaks. These duplicate efforts may add challenges to both the operational process and closing of signal leaks.

In order to address at least the aforementioned technical challenges, the systems, methods, and non-transitory computer readable media disclosed herein provide for initiating of a quality control procedure at a leakage receiver. Examples of leakage receivers may include Seeker D™, Seeker X™, and other such leakage receivers by Viavi™. The quality control procedure may be initiated by measurement of a signal leakage level for a signal leak at a specified location. This signal leakage level may be combined with a geo-location value and a time value measured by the leakage receiver, or by another device, such as a MCA III™ by Viavi™. The combined signal leakage level, geo-location value, and time value may be sent to a signal leakage analyzer to determine whether the technician was at the correct signal leak location and whether the signal leak status is to remain open, or whether a status of the signal leak is to be changed from open to closed. The signal leakage analyzer may be provided as a component of the leakage receiver, or n leakage system 157. The assessment by the signal leakage analyzer to open or close the signal leak may effectively provide a quality control check (or an audit, or validation) to ascertain the quality of remedial actions to close a signal leak.

For the systems, methods, and non-transitory computer readable media disclosed herein, the elements of the systems, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 9A illustrates a block diagram of an example of leakage system 157. Referring to FIG. 9, leakage system 157 may include a signal leakage level detector 902 to measure for a signal leak. Examples of different types of causes of signal leaks may include broken or cracked coaxial shielding, loose connections, misaligned or inadequate radio frequency (RF) seals on cable television (CATV) devices. The signal leaks may cause RF interference with Long-Term Evolution (LTE), broadcast television, frequency modulation (FM) and other off-air signals, as well as increased noise/interference in the upstream communication path. The signal leaks can be detected by leakage system 157 and remediated.

In the example shown in PG. 9A, a signal leak 904 is shown at location 906. For example, location 906 may be a customer premises. A work order, e.g., service ticket, may be opened for signal leak 904 and includes location 906 of the customer premises and time 930 that signal leak measurements are taken at the location 906. The location 906 and time 930 may be used to track leakage measurements taken within a predetermined location and time. This information and other information described herein with respect to leakage system 157 may be included as meta data for measured leakage metrics in a master service record created for the service issue.

The signal leakage level detector 902 may be used to measure signal leakage level 908 at a location, such as at or near location 906, and determines there is signal leak 904 at location 906. The signal leakage level detector 902 may assign, to the signal leakage level 908, a geo-location value 914 associated with the measurement of the signal leakage level 908. The geo-location value 914 may represent a physical location where a technician operates the leakage receiver 912 to measure the signal leak 904. For example, the geo-location value 914 is determined by a Global Positioning System (GPS) receiver (not shown) of the leakage receiver 912 when the signal leak 904 is detected by the signal leakage level detector 902. One of ordinary skill in the art readily understands that the geo-location value 914 may be determined by using various other techniques such as triangulation. Further, the signal leakage level detector 902 may assign, to the signal leakage level 908, a time value 916 associated with the measurement of the signal leakage level 908. An example of the t e value 916 may be provided in a day/month/year format, with a time of measurement of the signal leakage level 908.

With respect to the signal leakage level 908, metadata associated with the signal leakage level 908 may include the geo-location value 914, and the time value 916, and other metadata such as measured frequency associated with the signal leak 904, and other such details associated with the signal leakage level 908. Also, the metadata may include status 910, which may specify a status of the signal leak 904, e.g., open or closed. The status 910 may be stored with service ticket information for the leak. The leakage receiver 912 may include a button to initiate measurement of the signal leakage level 908, and to further transmit the signal leakage level 908, the geo-location value 914, and the time value 916 to the signal leakage analyzer 920. The signal leakage level 908, the geo-location value 914, and the time value 916 may be displayed on a display of the leakage receiver 912. Also, the status 910 may be displayed.

The signal leakage analyzer 920 analyzes the signal leak based on the signal leakage level 908, the geo-location value 914, and the time value 916 and other metadata to a signal leakage analyzer 920. The signal leakage analyzer 920 may update the status 910 if signal leakage level 908 and metadata indicate a change in status 910. For example, status 910 may be changed from being open to closed, or the status 910 of the signal leak 904 may be open based on an analysis of the signal leakage level 908, the geolocation value 914, and the time value 916 by the signal leakage analyzer 920. According to an example, the status 910 of the signal leak 904 may be changed from being open to dosed based on a determination, by the signal leakage analyzer 920, that the signal leakage level 908 is less than or equal to a specified signal leakage threshold 124. For example, the specified signal leakage threshold 124 may be set at 17 µV/m, 20 µV/m or another such value. All leaks in the CP greater than the threshold are logged and should be repaired in a timely manner. The status 910 of the signal leak 904 may be specified to remain open (assuming it was already open) based on a determination, by the signal leakage analyzer 920, that the signal leakage level 908 is greater than the specified signal leakage threshold 124. The signal leakage analyzer 920 may generate, based on the indication that the status 910 of the signal leak 904 remains open, another indication to service the signal leak 904.

In an example, the geo-location value 914 and the time value 916 are compared to location 906 and time 930 to determine whether the signal leakage level 908 is associated with the signal leak 904. For example, the signal leakage analyzer 920 determines whether the geo-location value 914 is within a specified distance threshold 926 of location 906 of signal leak 904. As indicated above, location 906 may be a customer premises, and time 930 is a time that the signal leak related issue was reported by the customer. For example, the geo-location value 914 may correspond to a distance of 5 feet from location 906, and the specified distance threshold 926 may be set at 10 feet for the signal leak 904, in which case the signal leakage level 908 may be designated as being associated with the signal leak 904. According to examples, the signal leakage analyzer 920 may determine that the gee-location value 914 corresponds to a distance from the signal leak 904 that is greater than the specified distance threshold 926 for the signal leak 904, and another indication that the signal leakage level 908 is not associated with the signal leak 904. The time value 916 of the measured signal leakage level 908 may be compared to time 930 to further determine whether the measured signal leakage level 908 is associated with the signal leak 904. According to examples, the signal leakage analyzer 920 can analyze the geo-location value 914 associated with the measurement of the signal leakage level 908 relative to location 906 of the signal leak 904 to determine a recommended direction of movement 934 towards the signal leak 904, which can be provided to signal leakage level detector 902. For example, based on comparison of the geo-location value 914 to location 906, a technician performing remedial actions with respect to the signal leak 904 may be directed to move left, right, or n another direction towards the signal leak 904 from the current position of the technician as specified by the geo-location value 914.

As disclosed herein, as shown in FIG. 9A, the signal leakage analyzer 920 may be implemented as a component of the leakage receiver 912 Alternatively, as shown in FIG. 9B, the signal leakage analyzer 920 may be implemented in the analysis server 922, a cloud environment, or another such environment, where the signal leakage level 908, the geo-location value 914, and the time value 916 may be analyzed as disclosed herein, and results of the analysis may be communicated (e.g., wirelessly, or otherwise) to the leakage receiver 912. In this regard, according to examples, the signal leakage analyzer 920 may receive, from the signal leakage level detector 902, a signal leakage level 908, a geo-location value 914, and a time value 916. The signal leakage level 908 may be measured by the signal leakage level detector 902 for a signal leak 904 at location 906, The signal leak 904 may include a status 910 of being open. The geo-location value 914 may be assigned to the signal leakage level 908, and may be associated with the measurement of the signal leakage level 908. The time value 916 may be assigned to the signal leakage level 908, and may be associated with the measurement of the signal leakage level 908. The signal leakage analyzer 920 may analyze the signal leakage level 908, the geo-location value 914, and the time value 916 to determine whether the status 910 has changed and update the status 910 accordingly. For example, an indication that the status of the signal leak 904 is changed from being open to closed, or the status 910 of the signal leak 904 is maintained as open assuming it as already open is transmitted to the signal leakage level detector 902, The signal leakage analyzer 920 may generate the indication to change the status 910 of the signal leak 904 from being open to closed based on a determination that the signal leakage level 908 is less than or equal to a specified signal leakage threshold 924, The signal leakage analyzer 920 may generate the indication to maintain the status 910 of the signal leak 904 as open based on a determination that the signal leakage level 908 is greater than the specified signal leakage threshold 924. Also, the status 910, the signal leakage level 908, the geo-location value 914, and the time value 916 and/or other meta data may be stored in the leakage database 156 for generating a master service record and for determining remedial actions.

FIG. 9C shows example hardware of the leakage system 157 that may execute machine readable instructions to perform processes. The hardware may include a processor 157a, and a memory 954 storing machine readable instructions that when executed by the processor 157a cause the processor 157a to perform steps described below. The processor 157a may include a processor, field-programmable gate array (FPGA) and/or other hardware processing circuits, to execute the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The memory 1604 may include a RAM, where the machine readable instructions and data for a processor may reside during runtime.

The memory 954 stores machine readable instructions 952, which may include instructions 956 to measure a signal leakage level, e.g., signal leakage level 908, at a specified location, such as location 906. The signal leak may include a status of open such as if a service ticket was previously open fora service issue. Also, the specified location may be determined based on a customer's QoE, such as at or near the customer premises or at or near a common network element in the CP, and/or based on location of the service issue determined from PNM data. A master service record may have been created based on the service issue. The processor 157a may fetch, decode, and execute the instructions 958 to assign to the measured signal leakage level 908 geo-location value 914 associated with the measurement of the signal leakage level 908. The geo-location value 914 is determined for the location where the signal leakage level 908 was measured. The processor 157a may fetch, decode, and execute the instructions 960 to assign, to the measured signal leakage level 908, time value 916 specifying when the measurement of the signal leakage level 908 was measured. The processor 157a may fetch, decode, and execute the instructions 962 to transmit the signal leakage level 1308, the geo-location value 1314, and the time value 1316 to signal leakage analyzer 920. The processor 157a may fetch, decode, and execute the instructions 1514 to receive, from the signal leakage analyzer 920 and based on an analysis of the signal leakage level 1308, an indication that the status 910 of the signal leak 904, which may be changed from being open to closed, or the status 910 of the signal leak 904 remains open. Receiving the indication may further include receiving the indication to change the status 910 of the signal leak 904 from being open to closed based on a determination, by the signal leakage analyzer 920, that the signal leakage level 908 is less than or equal to signal leakage threshold 924. Receiving an indication to maintain the status 910 of the signal leak 904 as open for example, may include receiving an indication that the determination, by the signal leakage analyzer 920, is based on the signal leakage level 908 being greater than signal leakage threshold 924.

Figure 10:
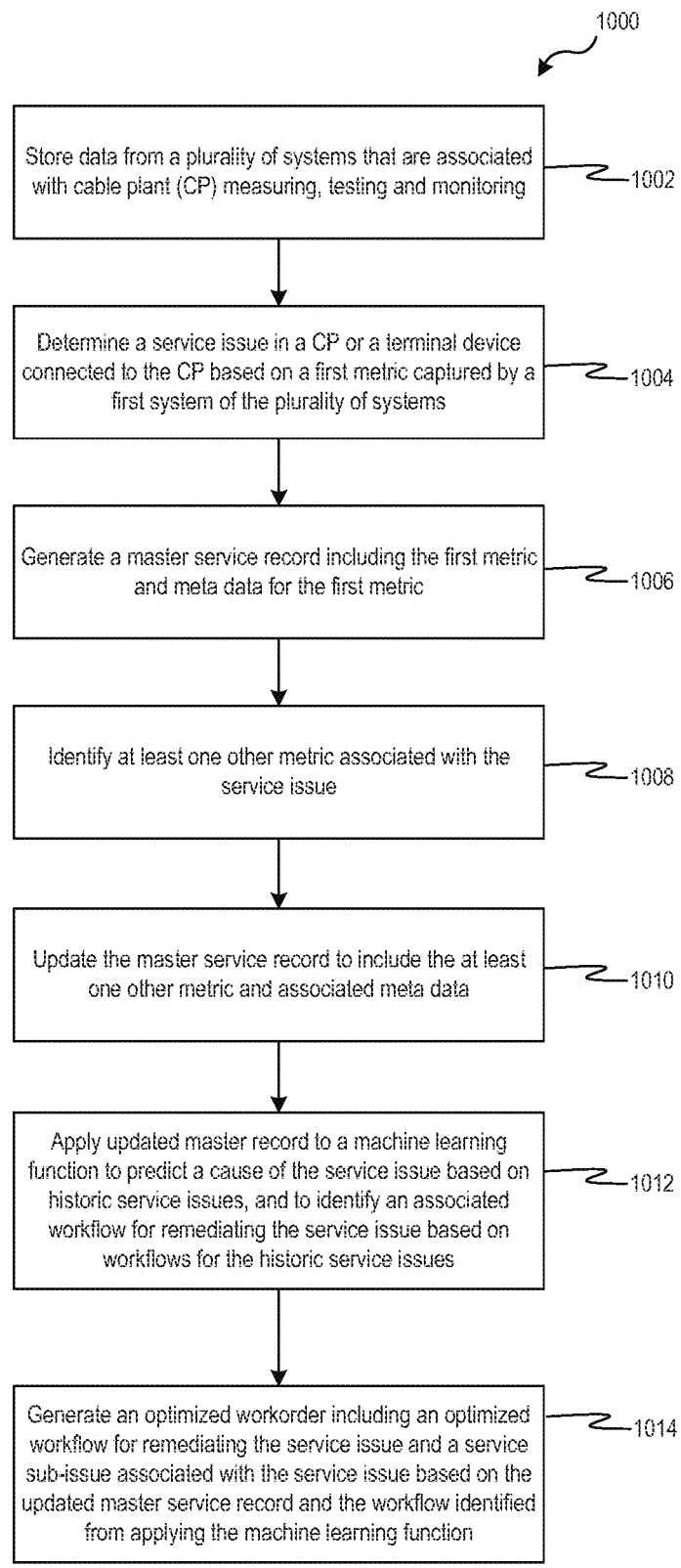
FIGS. 10-11 illustrate methods of intelligent monitoring and testing of a cable plant, according to examples of the present disclosure.

FIG. 10 is a block diagram of method 1000 of intelligent monitoring and remediating of a service issue in a CP, according to an example of the present disclosure. The CP as used herein may include any media and common network elements that connect between a headend and customer premises equipment. Examples of media may include fiber optics, coaxial, twisted pair, Ethernet, and wireless media including WiFi or any combination thereof. Examples of customer premises equipment may include a CM or settop box. In other examples, customer premises equipment may include a smartphone, laptop, tablet, etc. Also, a customer premise is not limited to the customer's home and may include a person, for example, using a smartphone as customer premises equipment, which may be connected to the CP through a wireless connection. The method is described by way of example as being performed by ISS 140 but may be performed by other systems. ISS 140 may include one or more processors and a memory or other storage device to store machine readable instructions executable by the one or more processors to perform the method. As is further described below, ISS 140 can intelligently diagnose and locate system problems based on data from multiple systems. Also, diagnosing, remediating and creating an optimized workflow may be performed based on a historic analysis of data from the systems using artificial intelligence and/or other pattern matching techniques.

At 1002, ISS 140 stores data, for example in server database 146, from a plurality of systems, such as the systems shown in FIG. 1A, that are associated with cable plant measuring, testing and monitoring. In an example, the systems may include automated systems that collect cable network monitoring data without human interaction, e.g., PNM system 155, upstream monitoring system 163, downstream monitoring system 165, fiber monitoring system 175, in-line device system 159 and other systems such as shown in FIG. 1A. In an example, the systems may also include systems that collect data for network monitoring based on human interaction, such as a service technician using test instrument 111 to collect data for detecting leakage or other network monitoring data.

At 1004, ISS 140 determines a service issue in a CP or a terminal device connected to the CP based on a first metric captured by a first system of the plurality of systems. The first metric may be part of the data stored at 1002. In an example, PNM data may indicate an impairment at a terminal device, e.g., a CM at a customer premises, or an impairment at a common network element in the CP. PNM data may include data captured from a PNM sweep. In an example, a PNM return sweep may be performed to capture upstream pre-equalization coefficients to remotely detect and localize impedance mismatches. Pre-eq coefficients from multiple CMs 104 can be analyzed to determine which terminal devices are working the hardest to compensate for impairments like micro-reflections and group delay. Downstream PNM data may include Downstream Symbol Capture, Downstream Wideband Spectrum Analysis, Downstream Noise Power Ratio (NPR) Measurement, Downstream Channel Estimate Coefficients, Downstream Constellation Display, Downstream RxMER Per Subcarrier, SNR Margin for Candidate Profile, Downstream FEC Statistics, Downstream Histogram, and Downstream Received Power. In an example, the metric captured at 1004 includes a CP leakage metric which may be compared to a threshold to detect and diagnose a service issue.

At 1006, ISS 140 generates a master service record including the first metric which is indicative of a service issue. In addition to the metric, the master service record may include meta data associated with the first metric. The meta data may include geolocation identifying a location of the terminal device or common network element and/or the associated CP subsection. The meta data may include time of day and date of the captured first metric. The meta data may include an identification (ID) of an associated terminal device or common network element if the first metric is associated as such, and the master service record may include an ID of a CP subsection where the associated terminal device or common network element is located. Additionally, the master service record my include a threshold value and/or a flag or status indicating the metric is indicative of a service issue based on a comparison to the threshold value for the metric.

At 1008, ISS 140 identifies at least one other metric associated with the service issue. The at least one other metric may be part of the data stored at 1002. This may include a metric captured by another system or the same system as the first metric but may also be indicative or associated with the service issue. In an example, the first metric captured by the first system at 1004 is captured by PNM system 155 and the at least one other metric identified at 1008 is a leakage metric captured by leakage system 157, upstream monitoring system 163, downstream monitoring system 165 and/or meter data system 161. The leakage metric may be associated with leaks upstream or downstream from the associated terminal device or common network element. In an example, the at least one other metric identified at 1008 includes multiple metrics, such as metrics from workforce management system 171, QoE system 173, weather forecast system 167, emergency management system 169, on site system 177, fiber monitoring system 175 and/or others. Meta data and thresholds associated with the at least one other metric may also be identified.

In an example, metrics for the CP subsection identified at 1006 (referred to as CP subsection metrics), including terminal devices or common network elements in the CP subsection identified at 1006 are identified and those metrics are used to identify the at least one other metric at 1008. For example, a service issue related to CM 104*d* may trigger an analysis of metrics for CP section 107, including metrics for CP subsections 106*a*-106*g*, and interconnected network elements such as node 102*a*, trunk amplifier 130, TAP 134*a*, line amplifier 132*a*, and line amplifier 132*b*. In an example, a service issue related to TAP 134*a* may trigger analysis of metrics for CMs in CP subsections that are connected to TAP 134*a*, For example, CM quality metrics, which may include leakage levels measured for CMs connected to TAP 134*a* an other metrics measured for those CMs, may be analyzed to determine whether they exceed a threshold to detect sub-issues. This information may be incorporated in the master service record if they are indicative of sub-issues.

At 1010, ISS 140 updates the master service record to include the at least one other metric identified at 1008. Other information associated with the at least one other metric may be included in the master service record, such as meta data described above with respect to step 1006. Accordingly, the updated master service record, for example, is a composite metric comprised of the first metric determined at 1004, the at least one other metric determined at 1008, and meta data for the first metric and the at least one other metric.

At 1012, the updated master service record generated at 1010 is applied to a machine learning function to predict a cause of the service issue based on historic service issues and/or to predict other service issues that may be caused by the service issue, and to identify an associated workflow for remediating the service issue based on workflows for the historic service issues. For example, the machine learning function compares the updated master service record to stored historic service issues, each having an associated workflow for locating, diagnosing and remediating the primary service issue and sub-issues, to determine whether there are any similar historic service issues that have been remediated in the past. The ISS 140, for example, includes the machine learning function which has the capability to identify patterns and make predictions to therefore guide the service technician on how to remediate the service issue. In an example, the machine learning function includes a neural network that is trained on historic services issues and related metrics for the service issues captured by the systems shown in FIG. 1B. For example, the neural network may be trained with composite metrics determined for historic service issues. The composite metrics may include measured metrics for each service issue, and meta data including time, location, trends, to make a prediction for the current service issue. The prediction may predict how similar the current service issue is to one or more historic service issues used to train the neural network, and may also include an associated workflow for remediating the current service issue based on historic workflows used to remediate related historic service issues.

In an example, the machine learning function is a neural network, but other machine learning functions may be used, such as classifiers or a support vector machine. In an example, the machine learning function is trained on historic data. The training is initially performed until the machine learning function makes predictions that have an accuracy above a threshold. Master service records may then be applied to the machine learning function to make predictions, including predicting steps to be performed, such as for an optimized workflow, to resolve primary service issue and sub-issues in a master service record. By way of example, ISS 140 may train a neural network using the historical values of metrics and associated meta data. Meta data may include parameters for one or more of the historical values of metrics, such as a time of day associated with a measurement, a day of a week associated with the measurement, a date associated with the measurement, whether the measurement occurred on a holiday, whether the measurement occurred on a weekend, one or more previous values of the KPI, a trend of one or more previous values of KPI, etc. Meta data may also include a plurality of associated relationship parameters, e.g., proximity to recent measurements of values of metrics, trends of recent measurements of values, and/or the like, and/or the like, to determine a prediction for a particular value of the metric. Training may continue by including resolved service issues in master service records in the historic data even after applying the neural network for making predictions on new master service records.

At 1014, ISS 140 generates an optimized workorder including an optimized workflow for remediating the service issue and a service sub-issue associated with the service issue based on the updated master service record and the predictions and the associated workflow identified at 1012. The optimized workflow specifies steps to locate, diagnose and remediate the service issue in the CP, including remediating a service sub-issue associated with the service issue. For example, PNM data regarding the service issue is stored in server database 146. As indicated above, ISS 140 subsequently checks with other systems shown in FIG. 1B to detect sub-issues. Also, ISS 140 determines if any other sub-issues are a cause of the service issue or if any other sub-issues are caused by the service issue.

Figure 11:
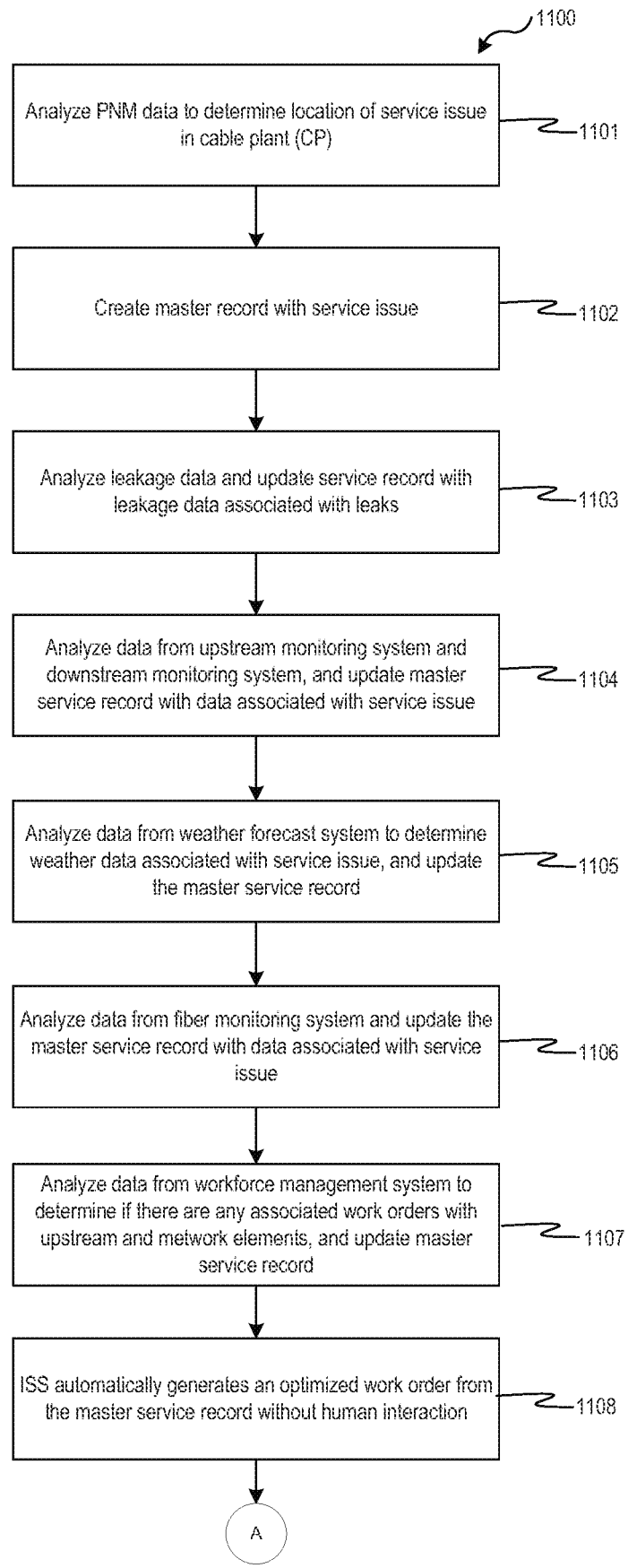
Figure 11:
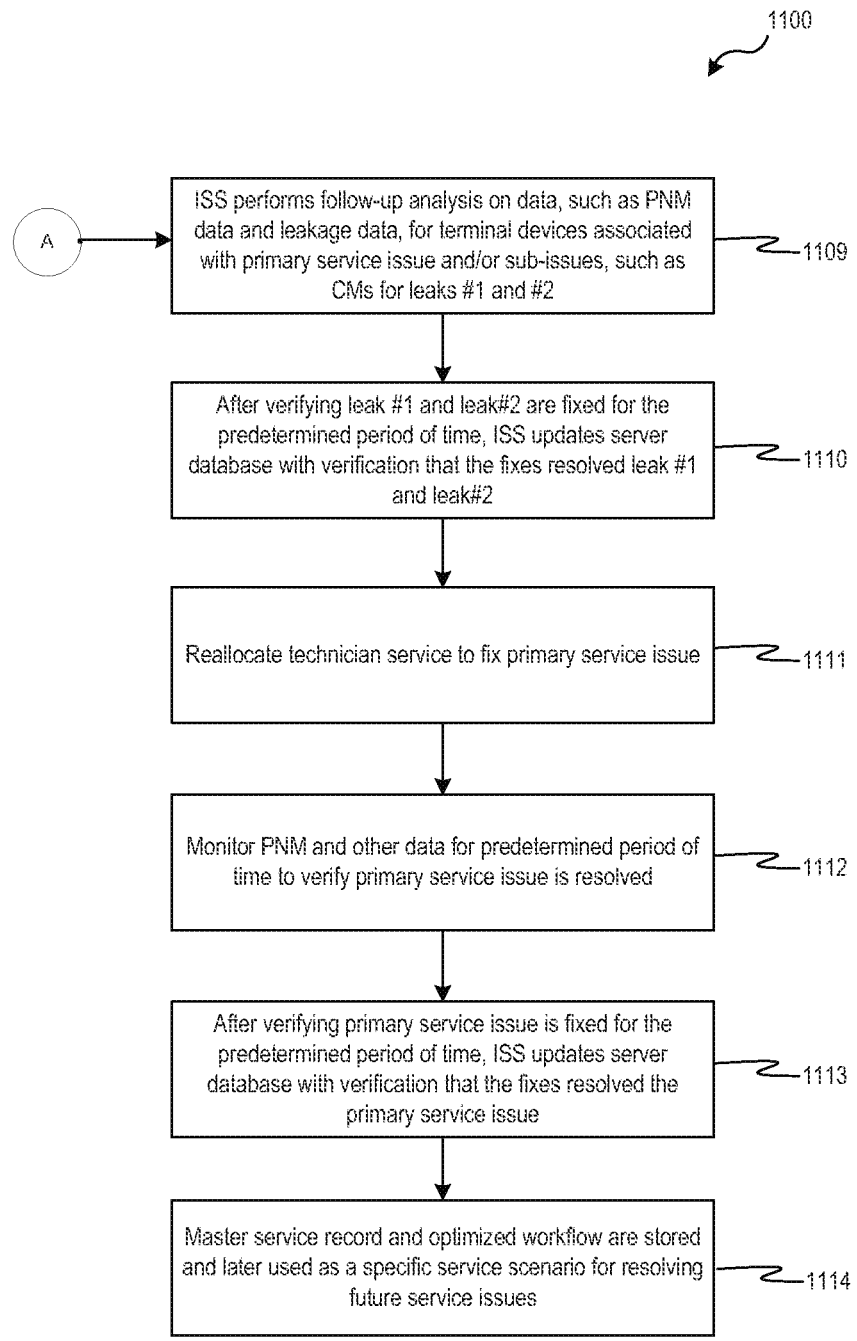

FIG. 11 block diagram of method 1100 of Intelligent monitoring and remediating of a specific service issue scenario in a CP, according to an example of the present disclosure. The method is described by way of example as being performed by ISS 140 but may be performed by other systems. ISS 140 may include one or more processors and a memory or other storage device to store machine readable instructions executable by the one or more processors to perform the method. Steps 1101-1107 describe analyzing data from multiple systems for generating an optimized work order. The data may include metrics described herein including metrics for measuring performance of signal transmission between a headend and customer premises equipment and other metrics. The data may also include historical data captured by each of the systems which may be used by a machine learning function for training and/or making predictions.

At 1101, PNM data is analyzed to determine a location of a service issue in the CP. In an example, the PNM data includes upstream pre-eq coefficients from CMs 104. The pre-eq coefficients are analyzed to detect impairments in the CP, such as micro-reflections, group delay or impedance mismatches. The pre-eq analysis can determine the approximate distance from a reflection point to an impedance mismatch. Through this analysis the location of the impairment can approximately be determined. In an example, assume the primary service issue is associated with TAP 134a shown in FIG. 1 and the location is determined to be approximately "X" feet from TAP 134a. Data from QoE system 173 may also be used to detect a service issue and its location, and this data may include location of a customer premises experiencing a service issue.

At 1102, a master service record is created that includes the service issue and a metric associated with the service issue and meta data for the metric. Even though PNM data, for example from PNM system 155, may determine approximate location of service issue, ISS 140 analyzes additional data from other systems to identify sub-issues that may be caused by the service issue or sub-issues that may cause the potential service issue. Subsequent steps described below include analyzing additional data from other systems shown in FIG. 1A and updating the master service record accordingly.

At 1103, ISS 140 analyzes data from leakage system 157 to assess any found leaks that could be related to the service issue in the master service record. For example, ISS 140 analyzes leakage data and determines that two leaks are in the path of the service issue and the master service record is updated with the leakage data and associated meta data concerning the leaks. In an example, leakage is detected from downstream spectral analysis, which may be in an upstream path from one or more terminal devices to the CMTS. The upstream path includes the service issue detected at 1021. The metric for leakage data may be field strength measured for a predetermined frequency range in microvolts per meter. For example, signal leakage is monitored in or near the 108-137 MHz aeronautical band, within which the maximum allowable leakage field strength is 20 µV/m at a distance of 3 meters (~10 feet) from the CP. The measured signal leakage and threshold, e.g., 20 µV/m, may be included in the master service record for each leak along with meta data, such as location and time.

At 1104, ISS 140 analyzes data from upstream monitoring system 163 and downstream monitoring system 165 to determine if noise or other issues are present in a terminal device at the same time PNM system 155 noticed the service issue. Typically, noise detected by both upstream monitoring system 163 and downstream monitoring system 165 points to a leakage related problem (noise getting in/out of the CP). In this example, upstream monitoring system 163 detects noise indicative of a service issue in the upstream, and downstream monitoring system 165 detects that some downstream channels have a bit error rate (BER) or Pre/Post errors indicative of a service issue. Leaks and associated noise indicate that LTE ingress may be entering the CP 106 at the two determined leakage points. ISS 140 updates the master service record with metrics and associated meta data. Examples of the metrics may include SNR for upstream transmission, MER, in channel frequency response, group delay, noise data, BER, Pre/Post errors, impedance mismatch and distance to fault. TDR and/or OTDR may be performed to determine distance to fault based on reflections. In an example, TDR and OTDR may be performed by a test instrument, which can be incorporated in the headend, to inject signals into media of the CP to measure distance to fault. One or more of the metrics may be captured by more than one of the systems described herein.

At 1105, ISS 140 analyzes data from weather forecast system 167 to determine weather data for the day of the logged service issue, a period of days preceding the logged service issue, and prospective weather forecasts for a period of days after the day of the logged service issue. Preferably, ISS 140 is responding on the same day as the logged service issue determined for example at 1021, The weather data is stored in server database 146. At 1028, ISS 140 updates the master service record with the weather data and associated meta data. Service issues often correlate with weather patterns due to effects of rain, snow, wind, etc. on the physical CP. The prospects of severe weather may indicate that the logged service issue may have a greater impact on service or may result in service interruption. In this case, a work order may be escalated in priority if weather patterns correlate with the logged service issue. Likewise, past weather data may be correlated with the logged service issue to assist in locating the cause of the issue. Intermittent service issues may be challenging to detect during periods of mild weather because the issue falls below a predetermined threshold. However, knowledge of the effect of weather on the service may indicate that points in the CP performing within specifications, but below an optimal threshold, thereby necessitating service. Weather also affects wireless and ethernet and At 1106, ISS 140 analyzes data from fiber monitoring system 175 to determine if there are an y fiber related service issues leading to the upstream node, e.g., node 102a. The fiber monitoring system may perform OTDR to the end of the fiber, i.e. the start of the RF CP, The fiber monitoring data and associated meta data is then updated to the master service record. For example, the master service record may be updated with loss events detected by the OTDR, including optical loss measured in decibels (dB) or decibel milliwatts (dBm) and distance to the fault causing the loss.

At 1107, ISS 140 analyzes data from workforce management system 171 to determine if there are any associated work orders that are pending or prior work orders with upstream network elements from the service issue. For example, work orders from workforce management system 171 for a predetermined number of days prior to the service issue are analyzed to determine whether there are any work orders related to the service issue. For example, five terminal devices associated with the node associated with the service issue are identified that have similar issues with BER. In that case, the five terminal devices are also put on a watch list and the work orders for the five terminal devices are summarized and attached to the master service record.

At 1108, the ISS 140 automatically generates an optimized work order from the master service record without human interaction. The optimized work order includes information for the primary service issue determined at 1021 and sub-issues associated with the primary service issue. By way of example, the optimized work order may contain information for the primary service issue as follows: The system determined that there was a problem at 101 Apple street at the TAP XYZ that has terminal devices A-E connected to it. The optimized work order also includes information pertaining to sub-issues such as follows: Secondary Customer issues; Leak #1—As part of the work Order leak #1 is assigned to the Technician; Leak #2—As part of the work order leak #2 is assigned to the Technician. The optimized work order directs the technician to address leak #1 and leak #2. The leaks are Geo Coded and the system can access Geo mapping tools to provide addresses and locations on a map for the technician.

The optimized work order includes an optimized workflow for locating, diagnosing and remediating the primary service issue and sub-issues. For example, the optimized workflow generated at step 1028 may be determined from applying the master service record to a machine learning function such as described above with respect to step 1012 in the method 1000. For example, the machine learning function compares the updated master service record to stored historic service issues, each having an associated workflow for locating, diagnosing and remediating the historic service issue. The optimized workflow may be based on an associated workflow fora stored historic service issue that is similar to the service issues in the master service record.

Also, the optimized workflow can includes steps to be performed by a service technician that optimizes the technician's time. For example, the optimized workflow may send the technician to the closest problems first, if the leaks and scheduled service issues have similar impact. Alternatively, ISS 140 prioritizes service issues having greater impact first. In general, hardline leakage issues potentially affect several terminal devices that are relatively close in proximity. Thus, the optimized workflow can route the technician to service the higher priority hardline leaks first. In an example, assume the optimized workflow includes steps for fixing leaks #1 and #2 first and then steps for fixing the primary service issue associated with TAP 134a.

Upon completion of the optimized work order, the ISS 140 queries the PNM system and other systems shown in FIG. 1A to confirm that fixes for the service issues show no further service issues as is further described below.

At 1109, ISS 140 performs follow-up analysis on data for terminal devices associated with the primary service issue and/or the sub-issues fora predetermined period of time. For example, leak #1 and leak #2 are prioritized in the optimized workflow and after completion of the service to leak #1 and leak #2, ISS 140 performs a follow-up analysis on PNM data and leakage for the associated CMs 104. ISS 140 continues to analyze the data for the associated CMs and associated upstream and downstream ingress levels for a period of days to verify that service is within specifications.

At 1110, after verifying leak #1 and leak #2 are fixed for the predetermined period of time, ISS 140 updates server database 146 with verification that the fixes resolved leak #1 and leak #2.

At 1111, after fixing known leakage problems in the CP, the optimized workflow reallocates the technician to service TAP 134a to fix the primary service issued. For example, as the technician arrives at TAP 134a, the ISS 140 analyzes PNM data, such as pre-eq coefficients, for C Ms for customer(s) affected by this service issue. By way of example, the technician finds a cracked TAP port connected to a specific customer premises, wherein a customer had generated a QoS service call. The technician swaps out the TAP port and reconnects the TAP to the customer premises.

At 1112, ISS 140 monitors PNM data and other data discussed above fora predetermined period of time to determine whether the primary service issue associated with TAP 134a is resolved.

At 1113, after verifying the primary service issue associated with TAP 134a is fixed for the predetermined period of time, ISS 140 updates server database 146 with verification that the fix resolved the primary service issue.

At 1114, the master service record and the optimized workflow are stored as historic data that can be used by the machine learning function to generate optimized workflows for future service issues, is stored and later used as a specific service scenario for intelligent monitoring and testing of the CP. ISS 140 queries workforce management system 171 to determine if there are any associated work orders with upstream network elements, and updates master service record.

What has been described and illustrated herein are examples of the disclosure along with some variations. The terms, descriptions, and figures used herein are set forth by way of Illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An intelligent monitoring and testing system for a cable network, the system comprising:
one or more processors; and
a memory storing machine readable instructions executable by the one or more processors, the one or more processors to execute the machine-readable instructions to:
store data received from a plurality of systems, wherein the data includes metrics captured by the plurality of systems;
determine a service issue in a cable plant (CP) of the cable network based on a first metric captured by a first system of the plurality of systems, the first metric being indicative of the service issue in the CP;
generate a master service record including the first metric captured by the first system;
identify at least one other metric associated with the determined service issue, wherein the at least one other metric was captured by a second system of the plurality of systems;
update the master service record to include the at least one other metric captured by the second system;
apply a machine learning function to the updated master service record to compare the updated master service record to stored historic service issues to identify any historic service issues that are related to the determined service issue and that have previously been remediated, wherein the related historic service issues have associated workflows for remediating the related historic service issues; and
generate an optimized work order including an optimized workflow for remediating the determined service issue based on the updated master service record and the associated workflows of the related historic service issues, wherein the optimized workflow specifies steps to locate, diagnose and remediate the determined service issue in the CP; and
remediate the determined service issue in the CP using the optimized workflow.

2. The system of claim 1, wherein to identify the at least one other metric associated with the determined service issue, the one or more processors are to execute the machine-readable instructions to:
identify a CP section, including CP subsections, of the cable network based on the first metric captured by the first system; and
determine CP subsection metrics for the CP subsections that are potentially indicative of service sub-issues associated with the service issue.

3. The system of claim 2, wherein to determine the CP subsection metrics, the one or more processors are to execute the machine-readable instructions to:
identify cable modems (CMs) in the CP subsections;
automatically query a database to obtain CM quality metrics for the CMs identified in the CP subsections;
compare the obtained CM quality metrics with a predetermined CM threshold value to identify CMs associated with the service sub-issues; and
update the master service record to include the CM quality metrics and corresponding flags for any of the CMs identified as being associated with the service sub-issues.

4. The system of claim 3, wherein to generate the optimized work order, the one or more processors are to execute the machine-readable instructions to:
for each corresponding flag, include in the optimized work order, an identifier of the CM associated with the corresponding flag, the CM quality metric for the CM, and the corresponding flag.

5. The system of claim 2, wherein to determine the CP subsection metrics, the one or more processors are to execute the machine-readable instructions to:
identify cable modems (CMs) in the CP subsections;
automatically query an upstream monitoring database to obtain upstream quality metrics for the identified CMs in the CP subsections, wherein the upstream quality metrics include upstream noise data, upstream bit error rate (BER), and upstream forward error correction (FEC) information; and
automatically query a downstream monitoring database to obtain downstream quality metrics for the identified CMs in the CP subsections, wherein the downstream quality metrics include downstream noise data, downstream BER, and downstream FEC information,
wherein the obtained upstream and downstream quality metrics are the CP subsection metrics for the CP subsections.

6. The system of claim 2, wherein to determine the CP subsection metrics, the one or more processors are to execute the machine-readable instructions to:
determine a geographical area corresponding to the CP section, including the CP subsections; and
automatically query a weather forecast database to obtain weather quality metrics for the CP subsections,
wherein the master service record is updated to include the obtained weather quality metrics for the CP subsections.

7. The system of claim 2, wherein to determine the CP subsection metrics, the one or more processors to execute the machine-readable instructions to:
query a fiber monitoring system database to obtain fiber quality metrics for the CP subsections,
wherein the master service record is updated to include the obtained fiber quality metrics.

8. The system of claim 7, wherein the fiber quality metrics correspond to common network elements that connect to fibers in the CP subsections.

9. The system of claim 2, wherein to determine the CP subsection metrics, the one or more processors to execute the machine-readable instructions to:
automatically query a workforce management system database to obtain pending work orders associated with cable modems (CMs) in the CP subsections and common network elements upstream from the CMs,
wherein the pending work orders are included in the optimized work order and are prioritized in the optimized work order based on location or based on impacted customer experience.

10. The system of claim 2, wherein to determine the CP subsection metrics, the one or more processors to execute the machine-readable instructions to:
  automatically query a quality of experience (QoE) database to obtain QoE metrics for cable modems (CMs) in the CP subsections,
  wherein the master service record is updated to include the QoE metrics.

11. The system of claim 1, wherein the first metric captured by the first system comprises noise power ratio, channel power, or pre-equalization coefficients for one or more of a terminal device connected to the CP and a common network element in the CP.

12. A non-transitory computer readable storage medium storing machine-readable instructions that when executed by one or more processors cause the one or more processors to:
  store data received from a plurality of systems, wherein the data includes metrics captured by the plurality of systems;
  determine a service issue in a cable plant (CP) of a cable network based on a first metric captured by a first system of the plurality of systems, the first metric being indicative of the service issue;
  identify at least one other metric associated with the determined service issue, wherein the at least one other metric was captured by a second system of the plurality of systems;
  generate a master service record including the first metric captured by the first system and the at least one other metric captured by the second system;
  apply a machine learning function to the master service record to compare the master service record to stored historic service issues to identify any historic service issues that are related to the determined service issue and that have previously been remediated, wherein the related historic service issues have associated workflows for remediating the related historic service issues;
  generate an optimized work order including an optimized workflow for remediating the determined service issue based on the master service record and the associated workflows of the related historic service issues, wherein the optimized workflow specifies steps to locate, diagnose and remediate the determined service issue in the CP;
  remediate the determined service issue in the CP using the optimized workflow.

13. The non-transitory computer readable storage medium of claim 12, wherein the one or more processors are to execute the machine-readable instructions to:
  identify a CP section, including CP subsections, of the cable network based on the first metric captured by the first system;
  determine CP subsection metrics for the CP subsections that are potentially indicative of service sub-issues associated with the determined service issue;
  identify cable modems (CMs) in the CP subsections;
  automatically query a database to obtain CM quality metrics for the CMs identified in the CP subsections;
  compare the obtained CM quality metrics with a predetermined CM threshold value to identify CMs associated with the service sub-issues; and
  update the master service record to include the obtained CM quality metrics and corresponding flags for any of the CMs identified as being associated with the service sub-issues.

14. The non-transitory computer readable storage medium of claim 13, wherein to generate the optimized work order, the one or more processors are to execute the machine-readable instructions to:
  for each corresponding flag, include in the optimized work order, an identifier of the CM associated with the corresponding flag, the CM quality metric for the CM, and the corresponding flag.

15. The non-transitory computer readable storage medium of claim 13, wherein to determine the CP subsection metrics, the one or more processors are to execute the machine-readable instructions to:
  identify cable modems (CMs) in the CP subsections;
  automatically query an upstream monitoring database to obtain upstream quality metrics for the CMs in the CP subsections, wherein the upstream quality metrics include upstream noise data, upstream bit error rate (BER), and upstream forward error correction (FEC) information; and
  automatically query a downstream monitoring database to obtain downstream quality metrics for the CMs in the CP subsections, wherein the downstream quality downstream metrics include downstream noise data, downstream BER, and downstream FEC information,
  wherein the obtained upstream and downstream quality metrics are the CP subsection metrics for the CP subsections.

16. The non-transitory computer readable storage medium of claim 13, wherein to determine the CP subsection metrics, the one or more processors are to execute the machine-readable instructions to:
  determine a geographical area corresponding to the CP section, including the CP subsections; and
  automatically query a weather forecast database to obtain weather quality metrics for the CP subsections,
  wherein the master service record is updated to include the obtained weather quality metrics for the CP subsections.

17. The non-transitory computer readable storage medium of claim 13, wherein to determine the CP subsection metrics, the one or more processors to execute the machine-readable instructions to:
  query a fiber monitoring system database to obtain fiber quality metrics for the CP subsections, wherein the fiber quality metrics correspond to common network elements that connect to fibers in the CP subsections, and the master service record is updated to include the obtained fiber quality metrics.

18. The non-transitory computer readable storage medium of claim 13, wherein to determine the CP subsection metrics, the one or more processors to execute the machine-readable instructions to:
  automatically query a workforce management system database to obtain pending work orders associated with cable modems (CMs) in the CP subsections and common network elements upstream from the CMs,
  wherein the pending work orders are included in the optimized work order and are prioritized in the optimized work order based on location or based on impacted customer experience.

19. The non-transitory computer readable storage medium of claim 13, wherein to determine the CP subsection metrics, the one or more processors to execute the machine-readable instructions to:
  automatically query a quality of experience (QoE) database to obtain QoE metrics for cable modems (CMs) in the CP subsections, wherein the master service record is updated to include the QoE metrics.

20. A method for identifying and remediating a service issue in a cable network, the method comprising:

receiving cable modem (CM) quality metrics for a cable plant (CP) in the cable network from a plurality of systems, wherein the CM quality metrics are measured by the plurality of systems monitoring the CP;

identifying a service issue in the CP based on a determination that a first CM quality metric of the CM quality metrics exceeds a threshold associated with the service issue, wherein the first CM quality metric was measured by a first system of the plurality of systems;

creating a master service record indicating the identified service issue, wherein the master service record includes the first CM quality metric measured by the first system, and an identification (ID) of a CM or common network element in the CP associated with the identified service issue;

identifying a second CM quality metric associated with the identified service issue, wherein the second CM quality metric was measured by a second system of the plurality of systems;

automatically updating the master service record to include the second CM quality metric measured by the second system;

applying a machine learning function to the updated master service record to compare the updated master service record to stored historic service issues to identify any historic service issues that are related to the identified service issue and that have previously been remediated, wherein the related historic service issues have associated workflows for remediating the related historic service issues;

generating an optimized workflow for remediating the identified service issue based on the updated master service record and the associated workflows of the related historic service issues, wherein the optimized workflow specifies steps to locate, diagnose and remediate the identified service issue in the CP; and remediating the identified service issue in the CP using the generated optimized workflow.

* * * * *